United States Patent [19]
Nakayama

[11] Patent Number: 5,777,985
[45] Date of Patent: Jul. 7, 1998

[54] APPARATUS AND METHOD FOR ABSORBING AN ARRIVAL TIME DELAY FLUCTUATION OF A FIXED LENGTH PACKET, AND ATM SWITCHING SYSTEM

[75] Inventor: Mikio Nakayama, Kawasaki, Japan

[73] Assignee: Fujitsu Limited, Kanagawa, Japan

[21] Appl. No.: 514,987

[22] Filed: Aug. 14, 1995

[30] Foreign Application Priority Data

Jan. 18, 1995 [JP] Japan ................... 7-005748

[51] Int. Cl.⁶ .............................................. H04J 3/14
[52] U.S. Cl. ........................ 370/235; 370/395; 370/429
[58] Field of Search ..................... 370/60, 60.1, 94.1, 370/94.2, 17, 13, 68.1, 229, 230, 231, 232, 233, 234, 235, 236, 252, 253, 395, 412, 428, 429, 431, 464, 465, 468, 474, 503, 522, 545, 473

[56] References Cited

U.S. PATENT DOCUMENTS

| | | | |
|---|---|---|---|
| 4,961,188 | 10/1990 | Lau | 370/94.2 |
| 5,050,162 | 9/1991 | Golestani | 370/60 |
| 5,260,978 | 11/1993 | Fleisher et al. | 375/106 |
| 5,301,193 | 4/1994 | Toyofuku et al. | 370/94.1 |
| 5,375,121 | 12/1994 | Nishino et al. | 370/94.2 |
| 5,430,721 | 7/1995 | Dumas et al. | 370/60.1 |
| 5,450,410 | 9/1995 | Hluchyi et al. | 370/473 |

Primary Examiner—Wellington Chin
Assistant Examiner—Huy D. Vu
Attorney, Agent, or Firm—Helfgott & Karas, P.C.

[57] ABSTRACT

An apparatus for absorbing an arrival time delay of a fixed length packet, equipped with a first-in, first-out type memory, a fixed length packet writing unit for reading out information stored within fixed length packet and for writing into the first-in, first-out type memory, a first-cell detection unit for detecting the fixed length packet which is first received, a read-out timing generation unit for, in the case where the first-received fixed length packet has been detected with the first cell detection unit, generating read-out timing that shows read-out initiation following a prescribed time lapse, and a read-out unit for, in the case where read-out timing has been generated with the read-out timing generation unit, initiating the read-out of information stored within the first-in, first-out type memory.

11 Claims, 24 Drawing Sheets

FIG.11
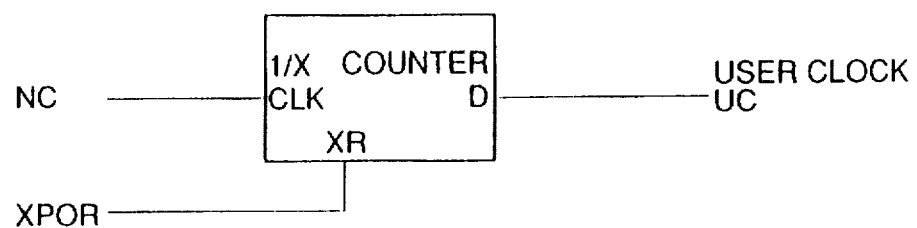
FIG.12a
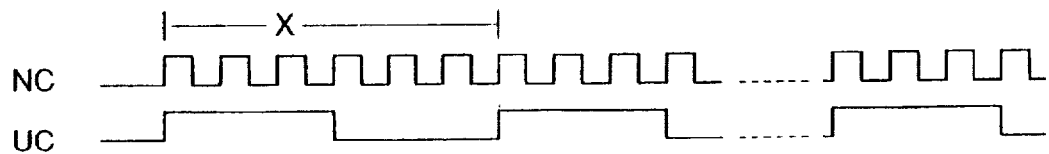
FIG.12b

FIG. 17a XRS
FIG. 17b CKI CELL CLOCK CECK
FIG. 17c READ START RDST

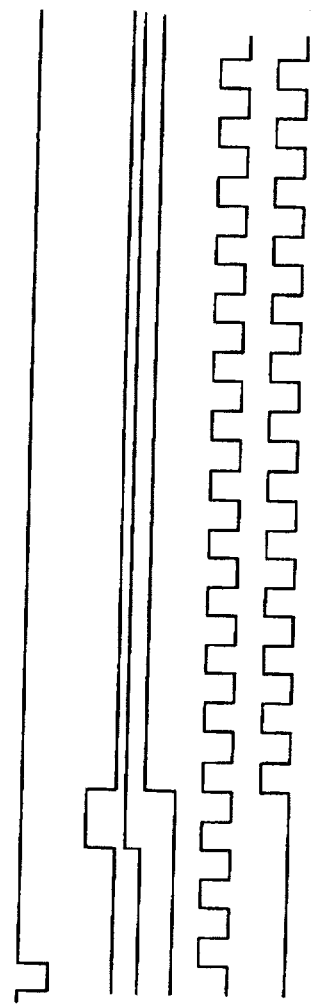

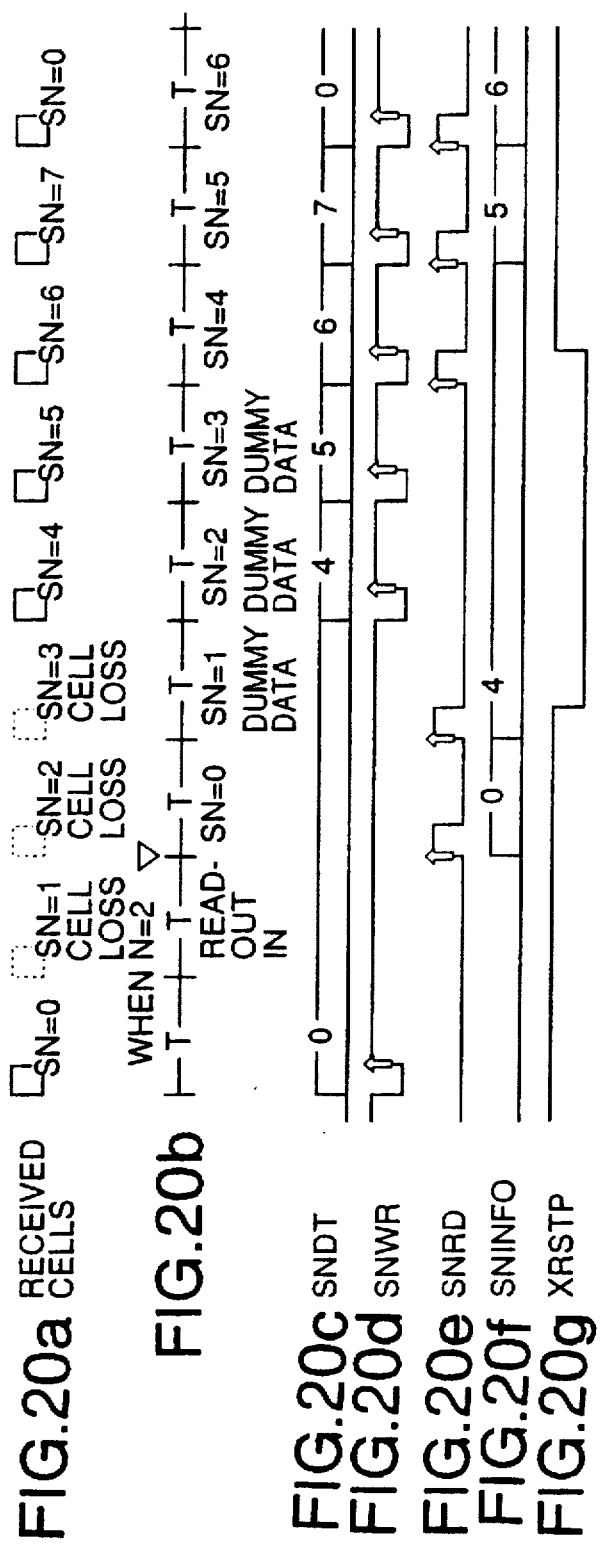

FIG.21a RECEIVED CELLS

FIG.21b

FIG.21c SNWR / XRS / SN

FIG.21d RDST / RDOKA / RDOK

FIG.21e CECK / SNRDA / SNRD

FIG.21f SNRD / SNINFO

FIG.21g PREVIOUS SN / SNPRV

FIG.21h DELTA SN / DSN

FIG.21i SNCNT / XRSTP

FIG.22
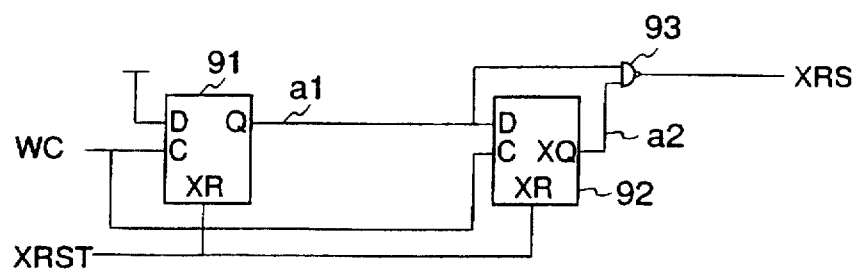

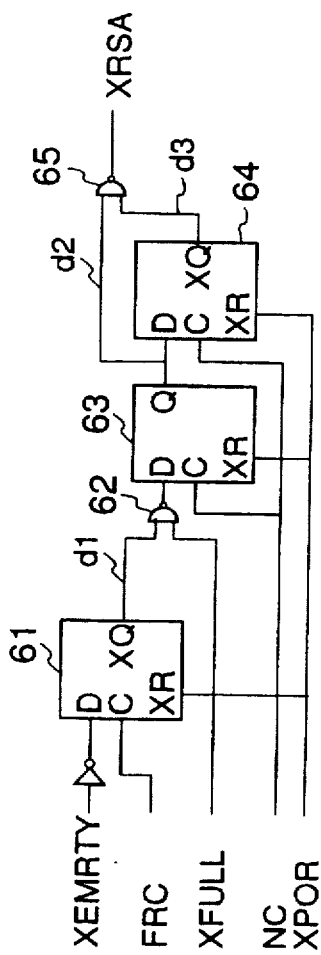
FIG.24
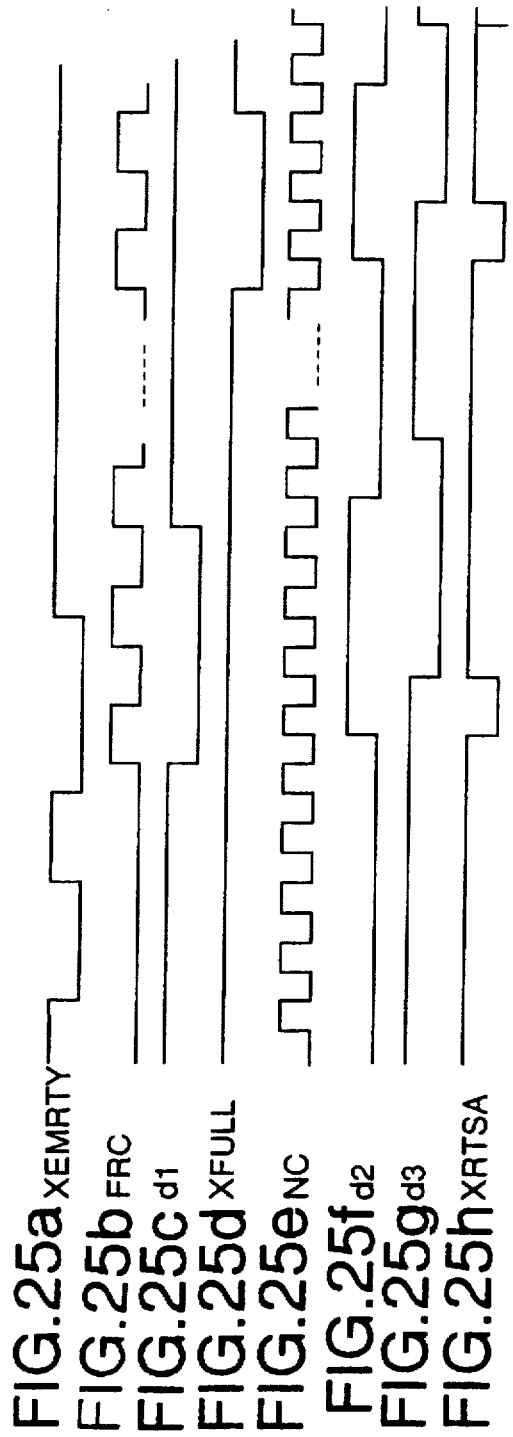
FIG.25a XEMRTY
FIG.25b FRC
FIG.25c d1
FIG.25d XFULL
FIG.25e NC
FIG.25f d2
FIG.25g d3
FIG.25h XRTSA

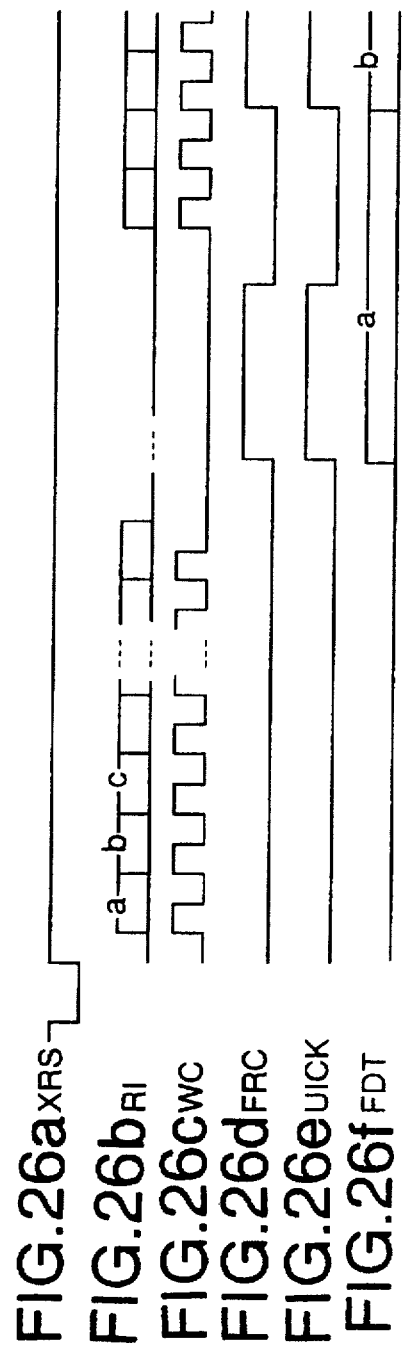

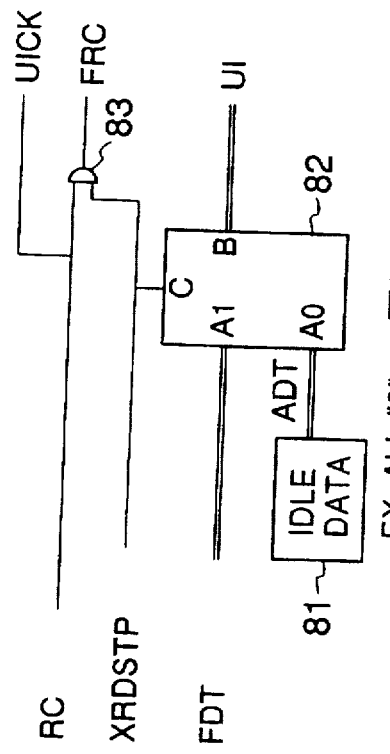

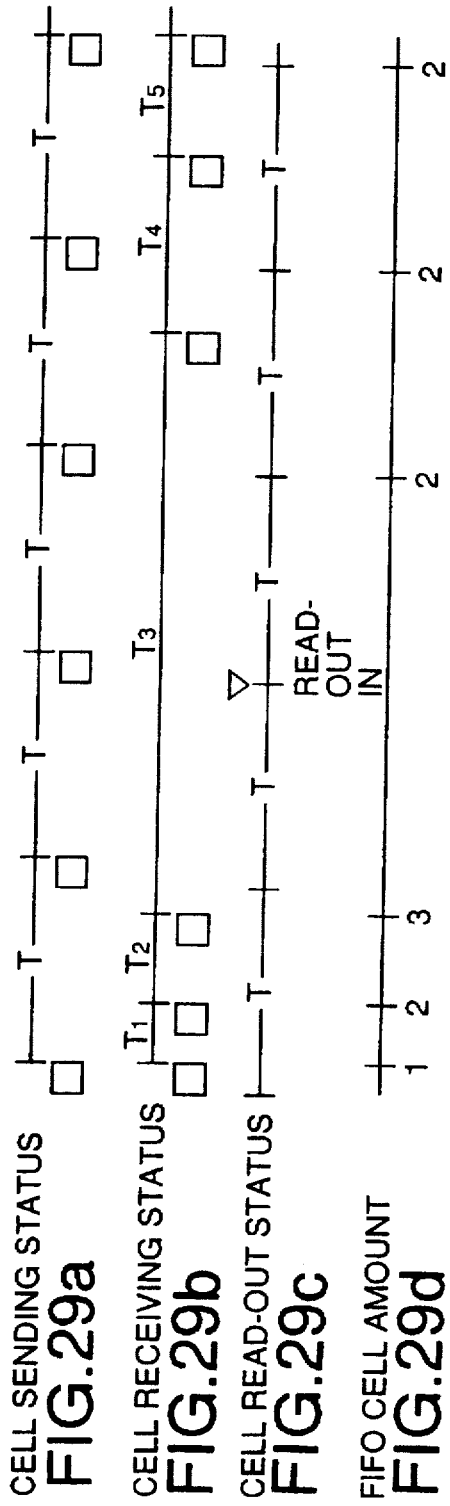

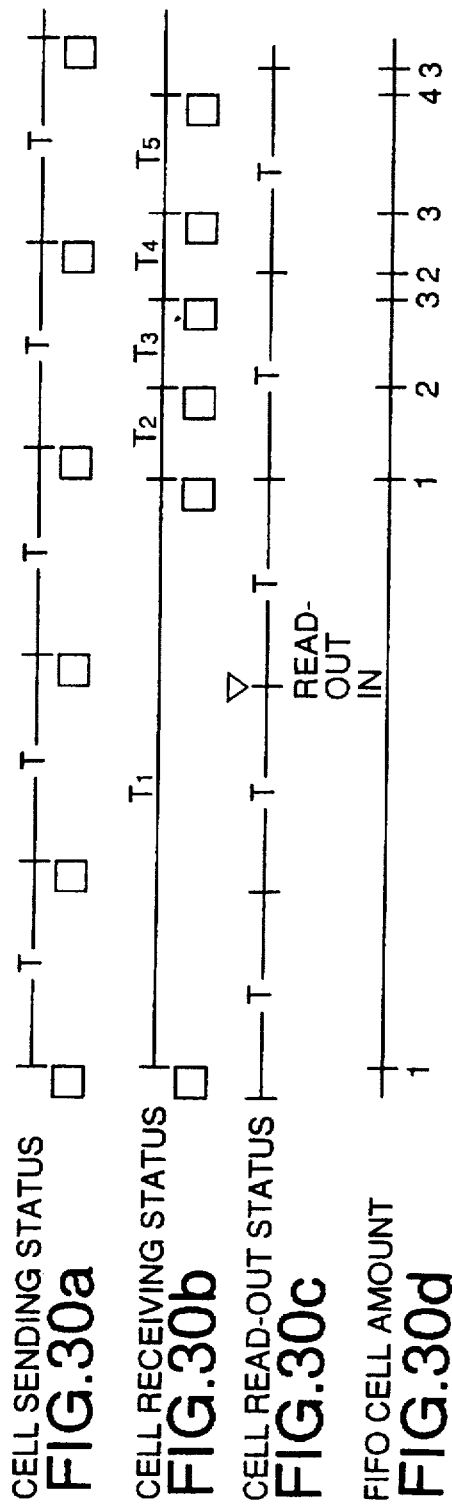

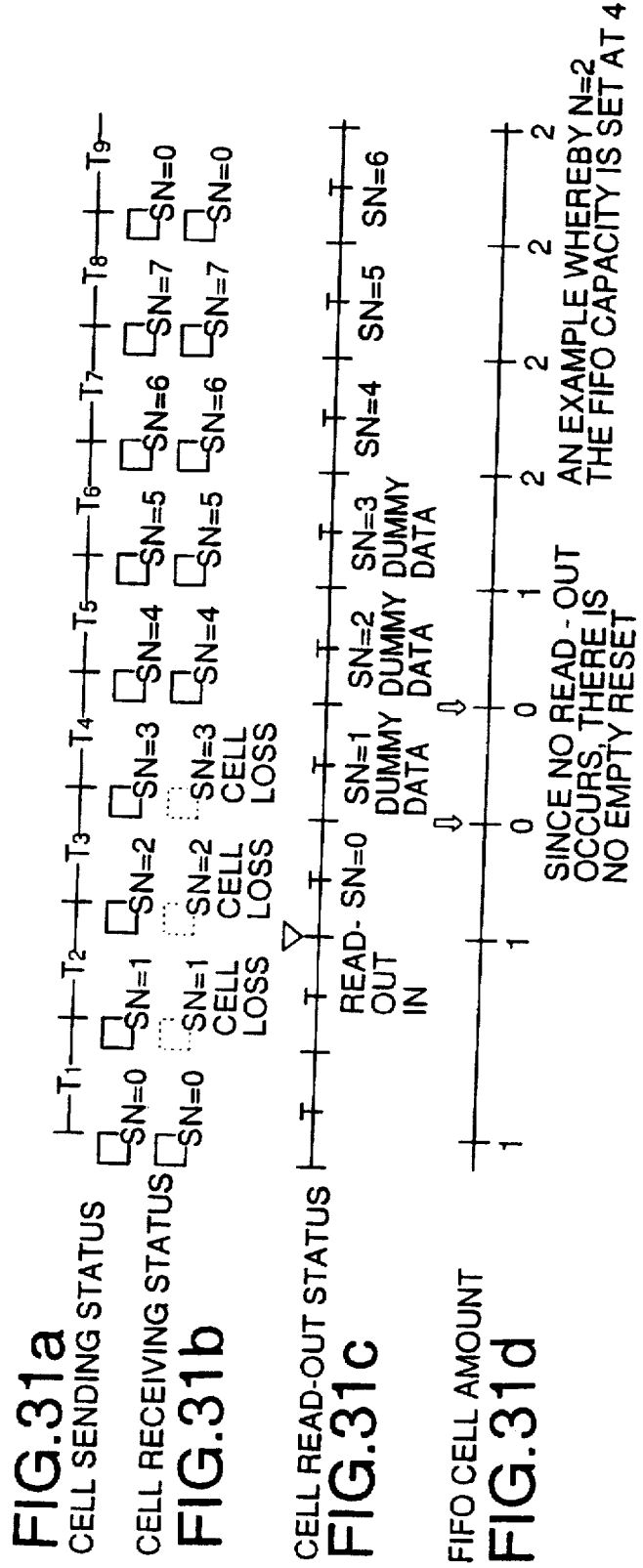

APPARATUS AND METHOD FOR ABSORBING AN ARRIVAL TIME DELAY FLUCTUATION OF A FIXED LENGTH PACKET, AND ATM SWITCHING SYSTEM

BACKGROUND OF THE INVENTION

The present invention relates to an apparatus for absorbing an arrival time delay fluctuation of a fixed length packet, a method for abosrbing an arrival time delay fluctuation of a fixed length packet and an ATM(Asynchronous Transfer Mode) switching system, and especially to an apparatus, a method and an ATM switching system for absorbing an arrival time delay fluctuation of fixed length packet on the reception side.

CBR (constant bit rate) service for providing sound, image, etc., at a fixed information speed is performed within the AAL (ATM adaptation layer) 1 of the ATM.

The arrangement for realizing this CBR service will be explained by referring to the diagrams. FIG. 2 shows the configuration of an ATM cell (below, also "cell"). As is well known, the ATM cell consists of a 5-byte long ATM header and a 48-byte long SAR-PDU (segmentation-and-reassembly-protocol data unit); the last byte of the ATM header is the HEC (header error control) for detecting header bit errors.

Then, the previously mentioned SAR-PDU has, within the AAL 1, the configuration shown in FIG. 3. In other words, the first 1 byte is used as the SAR header for storing the sending order of the ATM cell, while the remaining 47 bytes are used as the SAR-SDU (segmentation-and-reassembly-service data unit), the domain for storing sound, image, etc., information. Then, through recognition of the value stored within the previously mentioned SAR header, the reception side detects cell losses.

The previously mentioned SAR header has the configuration shown in FIG. 4. In other words, it consists of a 4-bit long SNF (sequence number field) located on the MSB side, and a 4-bit long SNPF (sequence number protect field) located on the LSB side.

Moreover, the SNF is comprised of a 1-bit long domain for showing the CS (convergence sublayer), and a 3-bit long domain for storing the SN (sequence number), any number from 0 to 7. The SN increments cyclically, and its value corresponds to the cell sending order.

Also, the SNPF consists of a 3-bit long domain for storing CRC (cyclic redundancy check) operation values used for SN error detection and correction, and a 1-bit domain for showing the EP (even parity). Furthermore, the CRC takes X as the SN value, and is generated with $X^3+X+1$.

Incidentally, the ATM exchange machine, after the ATM cells are stored within the switching buffer, reads out these cells and reroutes them to their destination point. Since this read-out is not performed at a fixed speed, sometimes fluctuations occur.

Also, transmission delays also occur, as well as congestion; and in the case where ATM cell loss results, sometimes fluctuations occur as well.

One example of an existing technology that has as its purpose the absorption of these kinds of ATM cell fluctuations, as shown in FIG. 5, consists of a [machine] equipped with a user clock divider unit 10, an FIFO unit 70, an ATM cell decomposition unit 20, a cell counter unit 30, a read clock generation unit 40, an AND circuit 50, an FIFO reset generation unit 60, and a selector unit 80.

Below is an explanation of each configuration element.

(a) User clock divider unit 10

The user clock divider unit 10 divides the network clock (for example, 155.52/8=19.44 MHz), and outputs the generated user clock UC.

(b) FIFO unit 70

The FIFO unit 70 is a first-in, first-out type memory for storing received information RI input from the ATM cell decomposition unit 20 and, along with this, for outputting stored data as data FDT.

(c) ATM cell decomposition unit 20

The ATM cell decomposition unit 20 extracts the 47-byte information unit (SAR-SDU) from the ATM cell, and writes this into the FIFO unit 70.

(d) Cell counter unit 30

The cell counter unit 30 counts the data amounts written into the FIFO unit 70 by cell units (47-byte units) and, along with this, in the case where N (N is an integer) units of cells required for fluctuation absorption have been written into the FIFO unit 70, outputs a timing RDST that shows the initiation of read-out to the read clock generation unit 40.

(e) Read clock generation unit 40

The read clock generation unit 40 outputs a read clock that is same with the user clock UC to the selector unit 80.

(f) FIFO reset generation unit 60

The FIFO reset generation unit 60 outputs a signal XRSA used for generating a signal XRST for resetting the FIFO unit 70.

Also, the FIFO reset generation unit 60, in the case where a read-out was performed when the FIFO unit 70 was in an empty state, and in the case where a write-in was performed when the FIFO unit 70 was in a full state, generates a reset pulse, resets the cell count unit 30 and the FIFO unit 70, and initiates an operation similar to a power-on reset.

(g) AND circuit 50

The AND circuit 50 takes the conjunction of the power-on reset signal XPOR and the signal XRSA, and outputs this result as the signal XRST.

(h) Selector unit 80

The selector unit 80, in the case where a cell number N required for fluctuation absorption has been written into the FIFO unit 70, outputs a signal FRC that is same with the user clock UC to the READ portion of the FIFO unit 70. Then, while reading out the data FDT from the FIFO unit 70, the selector unit 80 outputs at a fixed speed the user information UI.

With the existing fluctuation absorption technology described above, after the reception side has reached a prescribed state, the cell interval until the reception of N units (below, "the first N unit cell") is sometimes shortened due to fluctuation. In this case, the cell readout time becomes faster than in the case where fluctuation is less or is non-existent. Here, the "prescribed state" is said to be the state where the FIFO unit 70 has become either empty or full, and has been reset.

Incidentally, the sending side is sending ATM cells at fixed time intervals. As a result, after the reception of short-interval cells at the reception side, there is a large possibility that long-interval cells will be received, making it easy for the FIFO unit 70 to become empty. This problem will be explained while referring to FIG. 6.

Within FIG. 6, the below-described (a) through (d) are shown in order.

(a) The state whereby cells are sent at a fixed interval T. Furthermore, within FIG. 6, "☐" indicates a cell.

(b) The state whereby, because of fluctuation, cells are received at non-fixed intervals $T_1, T_2, \ldots T_5$.

(c) The state whereby received cells are read out from the FIFO unit 70 at fixed timing T.

(d) The state wherein a cell amount has been stored within the FIFO unit 70. Furthermore, the FIFO unit 70 has a storage capacity of 4 units of cells.

In the state shown in FIG. 6, after the cell amount stored within the FIFO unit 70 has reached 2 units, when read out of the cells is begun, at the point where the third cell has been read out, the FIFO unit 70 becomes empty, and an empty reset occurs.

Also, with the existing fluctuation absorption technology described above, the first N unit cell interval sometimes becomes longer due to fluctuation. In these types of cases, the cell read-out time becomes slower than in those cases where fluctuation is less or is non-existent.

Incidentally, the sending side is sending ATM cells at fixed time intervals. As a result, after the reception of long-interval cells at the reception side, there is a large possibility that short-interval cells will be received, making it easy for the FIFO unit 70 to become full. This problem will be explained while referring to FIG. 7.

Within FIG. 7, the below-described (a) through (d) are shown in order.

(a) The state whereby cells are sent at a fixed interval T. Furthermore, within FIG. 7, "☐" indicates a cell.

(b) The state whereby, because of fluctuation, cells are received at non-fixed intervals $T_1, T_2, \ldots T_5$.

(c) The state whereby received cells are read out from the FIFO unit 70 at fixed timing T.

(d) The state wherein a cell amount has been stored within the FIFO unit 70. Furthermore, the FIFO unit 70 has a storage capacity of 4 units of cells.

In the state shown in FIG. 7, after the cell amount stored within the FIFO unit 70 has reached 2 units, when read out of the cells is begun, prior to the read out of the second cell, the FIFO unit 70 becomes full, and a full reset occurs.

Additionally, with the existing fluctuation absorption technology described above, because of losses of a portion of the ATM cell sequence sent, it is easy for the FIFO unit 70 to become full. This problem will be explained while referring to FIG. 8.

Within FIG. 8, the below-described (a) through (d) are shown in order.

(a) The state wherein cells are being sent. Here, a number (SN) has been attached that cycles between 0–7. Moreover, within FIG. 7, "☐" indicates a cell.

(b) The state whereby, because of fluctuation, cells are received at non-fixed intervals $T_1, T_2, \ldots, T_5$. Here, the cells equivalent to SN=1–3 have been lost, and are considered as not having been received.

(c) The state whereby received cells are read out from the FIFO unit 70 at fixed timing T. Since the cells equivalent to SN=1–3 have been lost and are not stored within the FIFO unit 70, substitute dummy data is read out.

(d) The state wherein a cell amount has been stored within the FIFO unit 70. Furthermore, the FIFO unit 70 has a storage capacity of 4 units of cells.

In the state shown in FIG. 8, after the cell amount stored within the FIFO unit 70 has reached 2 units, when read out of the cells is begun, at the point where the SN=4 cell is to be read out, the FIFO unit 70 becomes full, and a full reset occurs.

FIGS. 6 through 8 are examples of cases where cells are begun to be read out after the cell amounts stored within FIFO unit 70 have become 2 units; in other words, in those cases where N=2. However, the value of N differs according to the system used; it may, for example, fluctuate as much as between 2 and 100.

Incidentally, the capacity of the FIFO unit 70, for the purpose of keeping the probability of this capacity for becoming empty and its probability for becoming full roughly equivalent, and to ensure that this capacity does not become too large, is generally set at a value approximately two times the value of N.

Here, when N is assumed to be a small value, there is a fear that the problems described above will occur and that normal operations will no longer be able to be performed; therefore, it is best to assume that this value be large to a certain degree. However, this means an increase in capacity of the FIFO, thereby increasing the amount of hardware at the same time as being undesirable in terms of cost.

SUMMARY OF THE INVENTION

With the foregoing in view, it is the first object of the present invention to provide an apparatus for absorbing an arrival time delay fluctuation of a fixed length packet that, after the reception side has attained a prescribed state, does not rely for a large part of its operations on cell fluctuations until N units of cells have been received.

Additionally, it is the second object of the present invention to provide a method for absorbing an arrival time delay fluctuation of a fixed length packet that, after the reception side has attained a prescribed state, does not rely for a large part of its operations on cell fluctuations until N units of cells have been received.

Additionally, it is the third object of the present invention to provide an ATM switching system that, after the reception side has attained a prescribed state, does not rely for a large part of its operations on cell fluctuations until N units of cells have been received.

(The first apparatus of the present invention)

The first apparatus of the present invention, in order to solve the first problem described above, is configured as described below.

Specifically, within the apparatus for absorbing an arrival time delay fluctuation of a fixed length packet, having a first-in, first-out type memory 5, there is a fixed length packet writing unit 1, a first cell detection unit 2, a read-out timing generation unit 3, and a readout unit 4.

(Fixed length packet writing unit 1)

The fixed length packet writing unit 1 reads out information stored in the previously mentioned fixed length packet, and writes it into the previously mentioned first-in, first-out type memory 5. Here, for example, the information read out is stored within the SAR-SDU domain of the ATM cell (see FIG. 3).

(First cell detection unit 2)

The first cell detection unit 2 detects the previously mentioned fixed length packet that was received first.

(Read-out timing generation unit 3)

The read-out timing generation unit 3, in the case where the previously mentioned fixed length packet that was received first has been detected with the previously mentioned first cell detection unit 2, generates read-out timing that shows read-out initiation following a prescribed time lapse.

(Read-out unit 4)

The read-out unit 4, in the case where read-out timing has been generated with the previously mentioned read-out timing generation unit 3, initiates read-out of information stored within the previously mentioned first-in, first-out type memory 5, and continues data read-out synchronistically to the user clock.

In this way, with the first apparatus of the present invention, data stored within the first-in, first-out type memory 5 is read out through the read-out unit 4 following the time lapse prescribed by the read-out timing generated with the read-out timing generation unit 3.

BRIEF DESCRIPTION OF THE DRAWINGS

FIG. 11 is a configuration diagram of the user clock divider unit.

FIG. 12 is an operations diagram of the user clock divider unit.

FIG. 19 is an operations diagram of the read clock generation unit.

FIG. 20 is an operations diagram of the ATM header detection unit and the read-out control unit at the time of cell loss.

FIG. 21 is an operations diagram of the read clock generation unit and the ATM header detection unit.

FIG. 22 is a configuration diagram of the first cell detection unit.

FIG. 23 is an operations diagram of the first cell detection unit.

FIG. 24 is a configuration diagram of the FIFO reset generation unit.

FIG. 25 is an operations diagram of the FIFO reset generation unit.

FIG. 26 is an operations diagram of the FIFO unit.

FIG. 27 is a configuration diagram of the selector unit.

FIG. 28 is an operations diagram of the selector unit.

FIG. 29 is an operations diagram of the case where, within the preferred embodiment, the first N cell has been received at a short interval due to an ATM cell fluctuation.

FIG. 30 is an operations diagram of the case where, within the preferred embodiment, the first N cell has been received at a long interval due to an ATM cell fluctuation.

FIG. 31 is an operations diagram of the case where, within the preferred embodiment, cells have been lost.

DETAILED DESCRIPTION OF THE PREFERRED EMBODIMENT

Prior to an explanation of a specific preferred embodiment, an outline configuration of the present invention will be explained based on the means for solving problems of the present invention.

(The first apparatus of the present invention)

Figure 1:
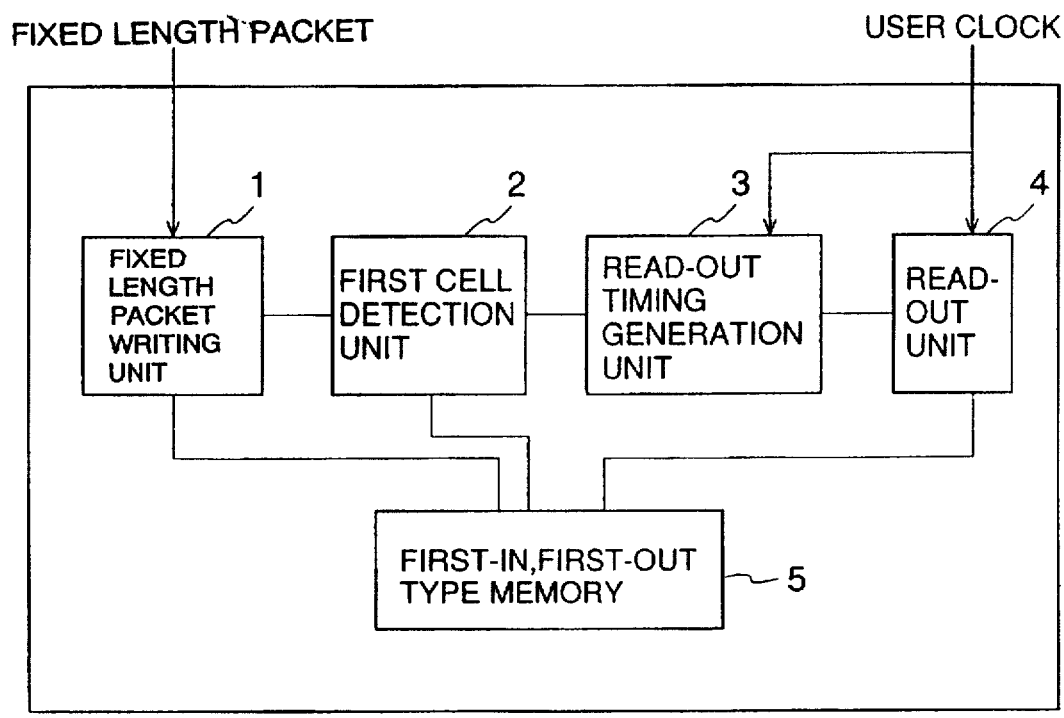
FIG. 1 is a fundamental configuration diagram of the first apparatus of the present invention.
Figure 2:
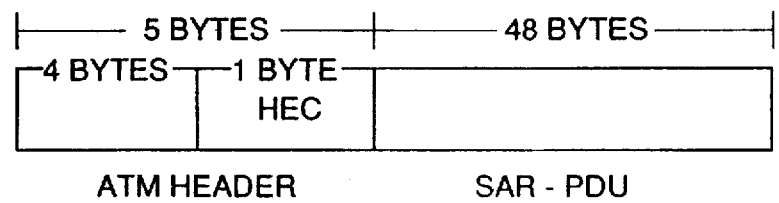
FIG. 2 is a configuration diagram of the ATM cell.

The first apparatus of the present invention, in order to solve the first problem described above, is configured as described below. FIG. 1 is a fundamental configuration diagram of the first apparatus of the present invention.

Specifically, within the apparatus for absorbing an arrival time delay fluctuation of a fixed length packet, having a first-in, first-out type memory 5, there is a fixed length packet writing unit 1, a first cell detection unit 2, a read-out timing generation unit 3, and a read-out unit 4.

(Fixed length packet writing unit 1)

Figure 3:
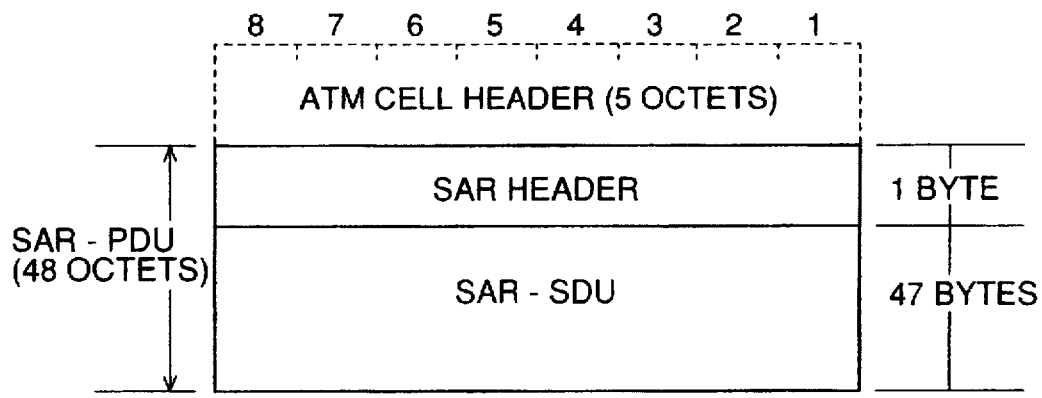
FIG. 3 is a configuration diagram of the SAR-PDU of the ATM cell.
Figure 4:
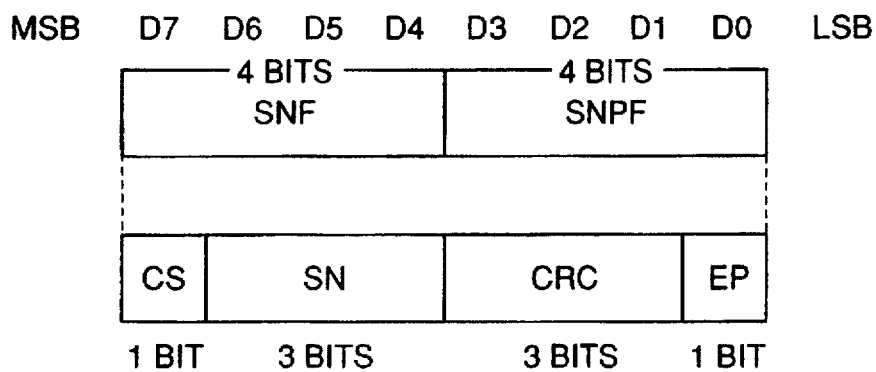
FIG. 4 is a configuration diagram of the SAR header of the ATM cell.
Figure 5:
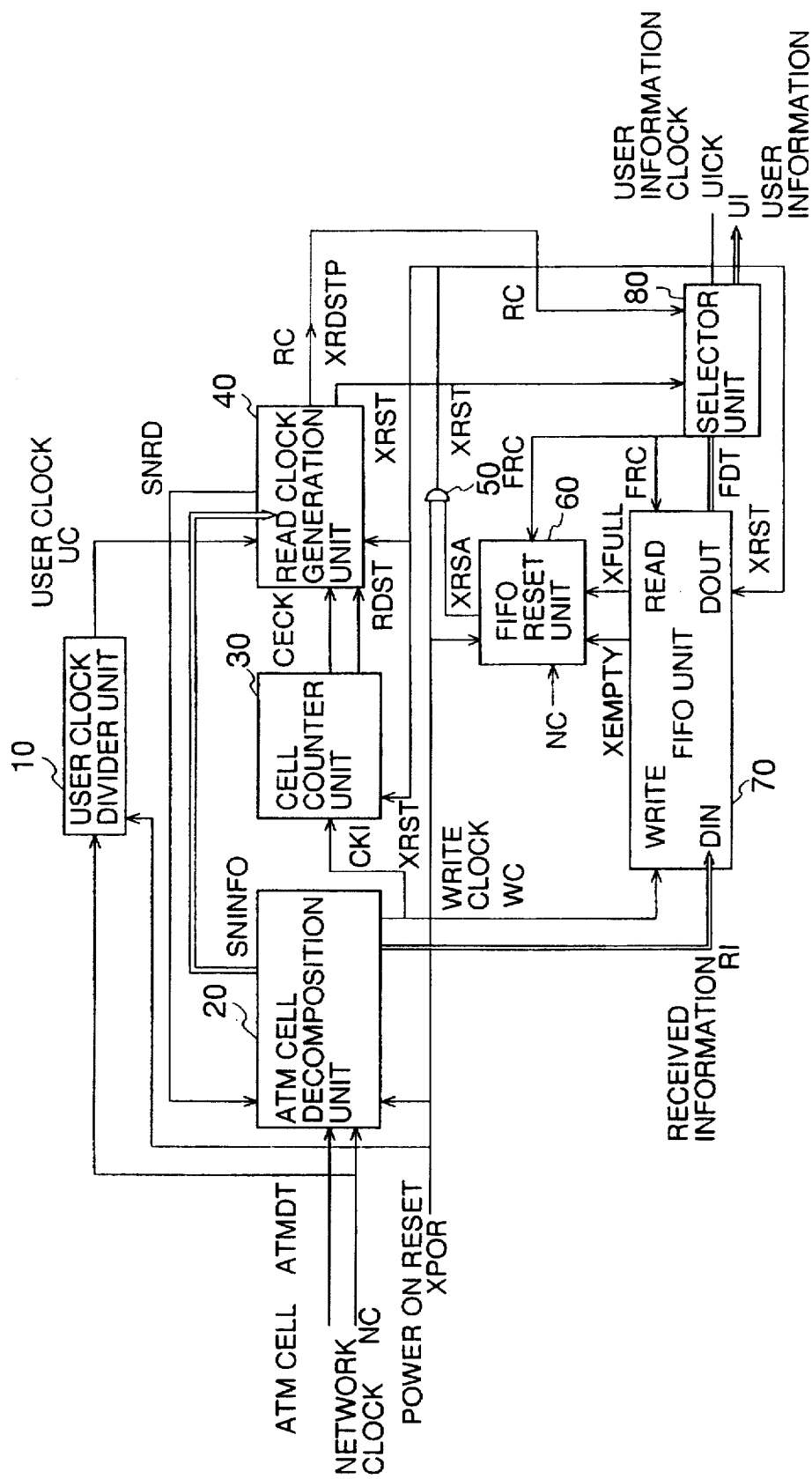
FIG. 5 is a configuration diagram of an existing ATM cell fluctuation absorption apparatus.
Figure 6:
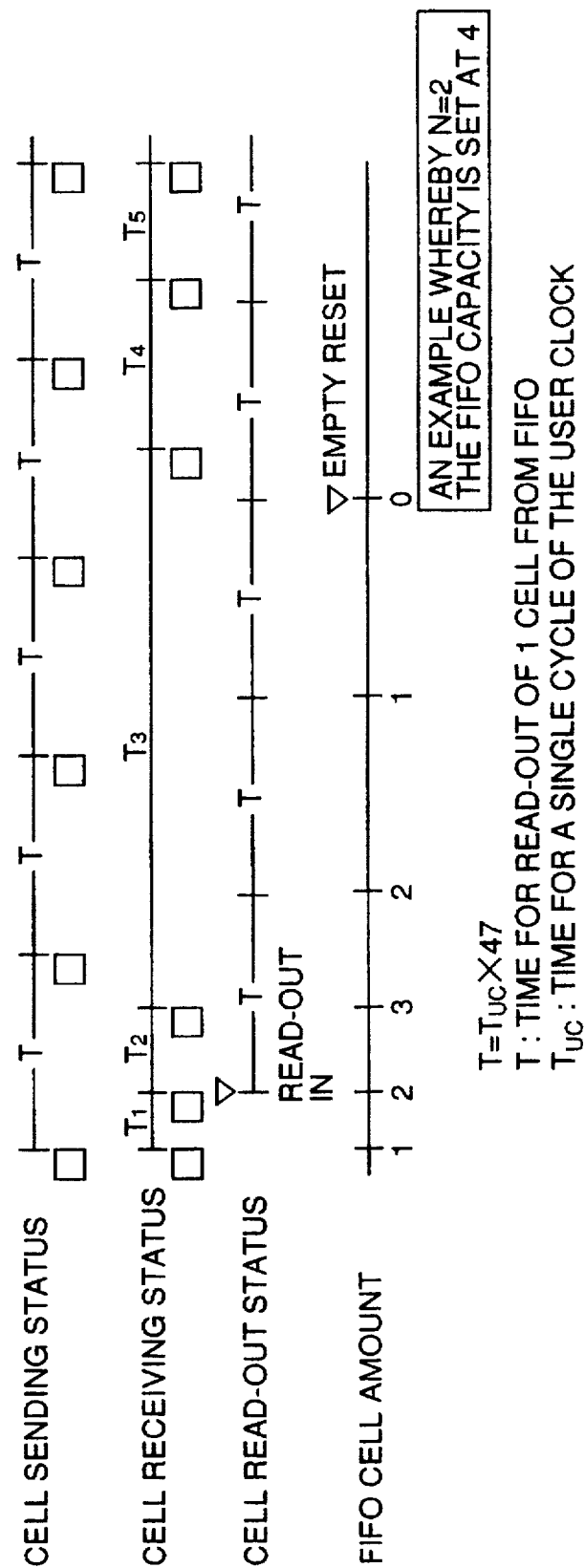
FIG. 6 in an operations diagram showing, within an existing ATM cell fluctuation absorption apparatus, the case where the first N cell was received at a short interval due to an ATM cell fluctuation.
Figure 7:
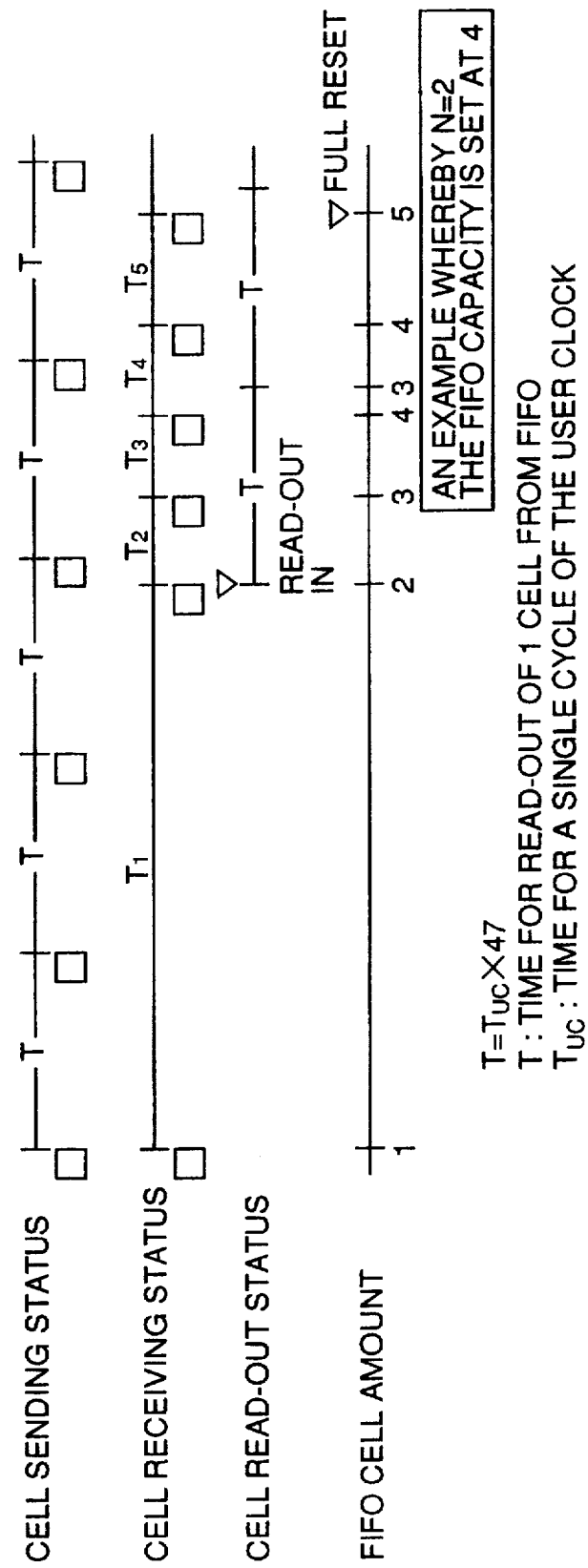
FIG. 7 is an operations diagram showing, within an existing ATM cell fluctuation absorption apparatus, the case where the first N cell was received at a long interval due to an ATM cell fluctuation.
Figure 8:
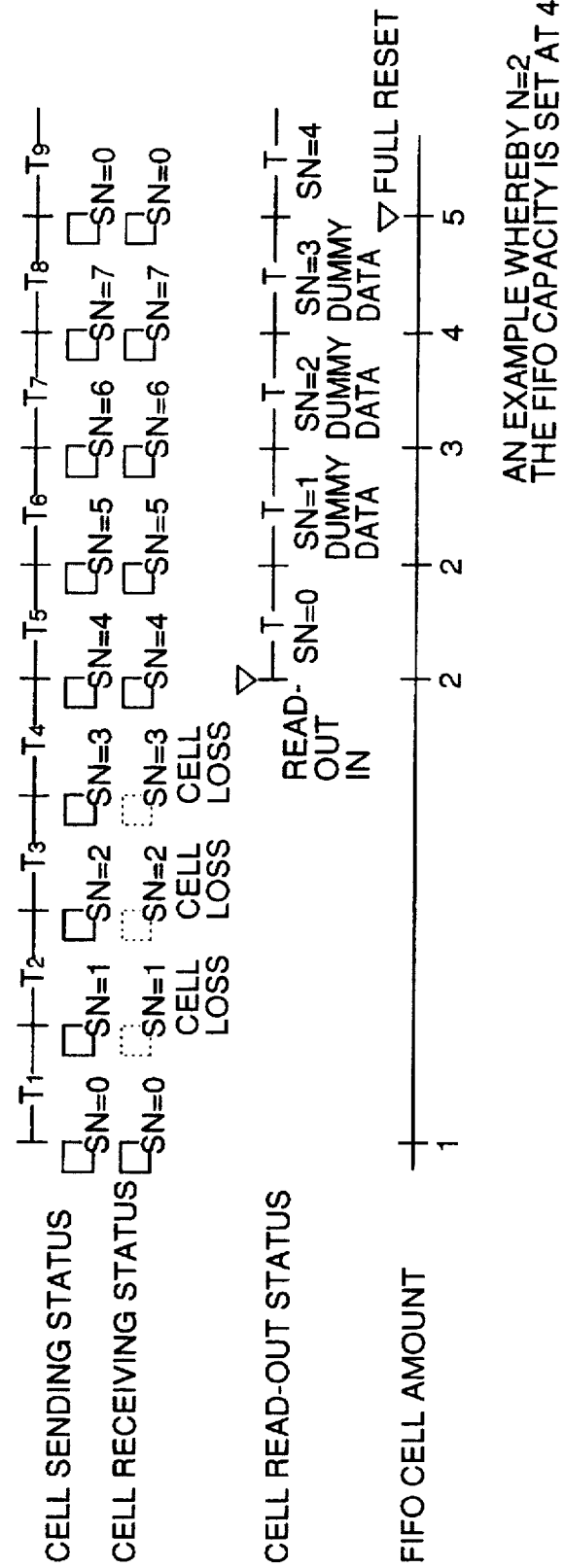
FIG. 8 is an operations diagram showing, within an existing ATM cell fluctuation absorption apparatus, the case where cells have been lost.

The fixed length packet writing unit 1 reads out information stored in the previously mentioned fixed length packet, and writes it into the previously mentioned first-in, first-out type memory 5. Here, for example, the information read out is stored within the SAR-SDU domain of the ATM cell (see FIG. 3).

(First cell detection unit 2)

The first cell detection unit 2 detects the previously mentioned fixed length packet that was received first.

(Read-out timing generation unit 3)

The read-out timing generation unit 3, in the case where the previously mentioned fixed length packet that was received first has been detected with the previously mentioned first cell detection unit 2, generates read-out timing that shows read-out initiation following a prescribed time lapse.

(Read-out unit 4)

The read-out unit 4, in the case where read-out timing has been generated with the previously mentioned read-out timing generation unit 3, initiates read-out of information stored within the previously mentioned first-in, first-out type memory 5, and continues data read-out synchronistically to the user clock.

In this way, with the first apparatus of the present invention, data stored within the first-in, first-out type memory 5 is read out through the read-out unit 4 following the time lapse prescribed by the read-out timing generated with the read-out timing generation unit 3.

(The second apparatus of the present invention)

The second apparatus of the present invention, in order to solve the first problem described above, is configured as described below.

Specifically, within the first apparatus of the invention, the previously mentioned read-out timing generation unit 3 inputs a fixed-cycle clock from an external source in order to measure the lapse of the prescribed time.

In this way, with the second apparatus of the present invention, within the read-out timing generation unit 3, the lapse of the prescribed time is measured with a fixed-cycle clock inputted from an external source.

(The third apparatus of the present invention)

The third apparatus of the present invention, in order to solve the first problem described above, is configured as described below.

Specifically, within the first apparatus of the invention, in the case where the previously mentioned first cell detection unit detects the previously mentioned fixed length packet received first, the previously mentioned read-out timing generation unit 3 is reset.

In this way, with the third apparatus of the present invention, in the case where the previously mentioned first cell detection unit detects the previously mentioned fixed length packet received first, the previously mentioned read-out timing generation unit 3 is reset.

(The fourth apparatus of the present invention

The fourth apparatus of the present invention, in order to solve the first problem described above, is configured as described below.

Specifically, within the first apparatus of the invention, the previously mentioned read-out timing generation unit 3, in order to generate the previously mentioned read-out timing, uses the user clock generated by the previously mentioned read-out unit 4 as the clock for reading out data from the previously mentioned first-in, first-out type memory 5 as the input clock used for measuring prescribed times within the previously mentioned read-out timing.

In this way, with the fourth apparatus of the present invention, within the read-out timing generation unit 3, by inputting the user clock generated by the read-out unit 4 to measure prescribed times, read-out timing is generated.

(The fifth apparatus of the present invention)

The fifth apparatus of the present invention, in order to solve the first problem described above, is configured as described below.

Specifically, within the first apparatus of the invention, the user clock inputted into the previously mentioned read-out timing generation unit 3 is generated based on a network clock.

(The sixth apparatus of the present invention)

The sixth apparatus of the present invention, in order to solve the first problem described above, is configured as described below.

Specifically, within the first apparatus of the invention, the previously mentioned fixed length packet stores information that is required to be transmitted at a fixed speed.

(The seventh apparatus of the present invention)

The seventh apparatus of the present invention, in order to solve the first problem described above, is configured as described below.

Specifically, within the first apparatus of the invention, the previously mentioned first cell detection detects the fixed length packet which is first received, subsequent to one of the cases that a power is supplied into the apparatus, that data read-out is performed in a state of the previously mentioned first-in, first-out type memory being empty, and that data writing is performed in a state of the previously mentioned first-in, first-out type memory in which data is stored up to upper limit.

With the first through seventh apparatuses of the present invention explained above, since these make it difficult for a situation to occur whereby data read-out is performed when the first-in, first-out type memory 5 is in an empty state, or whereby data is written within this memory 5 when it is in a state where data has been stored to the maximum level, stable operation is guaranteed; these apparatuses also have the effect of, after the reception side has attained a prescribed state, eliminating the reliance for a large part of their operations on cell fluctuations until N units of cells have been received. As a result, the capacity of the first-in, first-out type memory 5 does not need to be enlarged beyond the required capacity, and the amount of hardware needed and the financial costs incurred may also be reduced.

(The first method of the present invention)

The first method of the present invention, in order to solve the second problem described above, is configured as described below.

Specifically, within the method for absorbing an arrival time delay fluctuation of a fixed length packet, for systems having a first-in, first-out type memory 5, there is a fixed length packet writing step S1, a first cell detection step S2, a read-out timing generation step S3, and a read-out step S4.

(Fixed length packet writing step S1)

The fixed length packet writing step S1 reads out information stored in the previously mentioned fixed length packet, and writes it into the previously mentioned first-in, first-out type memory 5. Here, for example, the information read out is stored within the SAR-SDU domain of the ATM cell (see FIG. 3).

(First cell detection step S2)

The first cell detection step S2 detects the previously mentioned fixed length packet that was received first.

(Read-out timing generation step S3)

The read-out timing generation step S3, in the case where the previously mentioned fixed length packet that was received first has been detected with the previously mentioned first cell detection step S2, generates read-out timing that shows read-out initiation following a prescribed time lapse.

(Read-out step S4)

The read-out step S4, in the case where read-out timing has been generated with the previously mentioned read-out timing generation step S3, initiates read-out of information stored within the previously mentioned first-in, first-out type memory 5, and continues data read-out synchronistically to the user clock.

In this way, with the first method of the present invention, data stored within the first-in, first-out type memory 5 is read out through the read-out unit 4 following the time lapse prescribed by the read-out timing generated with the read-out timing generation unit 3.

With the first method of the present invention explained above, since this make it difficult for a situation to occur whereby data read-out is performed when the first-in, first-out type memory 5 is in an empty state, or whereby data is written within this memory 5 when it is in a state where data has been stored to the maximum level, stable operation is guaranteed; this method also have the effect of, after the reception side has attained a prescribed state, eliminating the reliance for a large part of their operations on cell fluctuations until N units of cells have been received. As a result, the capacity of the first-in, first-out type memory 5 does not need to be enlarged beyond the required capacity, and the amount of hardware needed and the financial costs incurred may also be reduced.

(The first ATM switching system of the present invention)

The first ATM switching system of the present invention, in order to solve the third problem described above, is configured as described below.

Specifically, within the ATM switching system, having an ATM cell switch, there is, in a line interface coupling a transmission line to the previously mentioned ATM cell switch, a first-in, first-out type memory 5, fixed length packet writing unit 1, a first cell detection unit 2, a read-out timing generation unit 3, and a read-out unit 4.

(Fixed length packet writing unit 1)

The fixed length packet writing unit 1 reads out information stored in the previously mentioned fixed length packet, and writes it into the previously mentioned first-in, first-out type memory 5. Here, for example, the information read out is stored within the SAR-SDU domain of the ATM cell (see FIG. 3).

(First cell detection unit 2)

The first cell detection unit 2 detects the previously mentioned fixed length packet that was received first.

(Read-out timing generation unit 3)

The read-out timing generation unit 3, in the case where the previously mentioned fixed length packet that was received first has been detected with the previously mentioned first cell detection unit 2, generates read-out timing that shows read-out initiation following a prescribed time lapse.

(Read-out unit 4)

The read-out unit 4, in the case where read-out timing has been generated with the previously mentioned read-out timing generation unit 3, initiates read-out of information stored within the previously mentioned first-in, first-out type memory 5, and continues data read-out synchronistically to the user clock.

In this way, with the first ATM switching system of the present invention, data stored within the first-in, first-out type memory 5 is read out through the read-out unit 4 following the time lapse prescribed by the read-out timing generated with the read-out timing generation unit 3.

With the first ATM switching system of the present invention explained above, since this make it difficult for a situation to occur whereby data read-out is performed when the first-in, first-out type memory 5 is in an empty state, or whereby data is written within this memory 5 when it is in a state where data has been stored to the maximum level, stable operation is guaranteed; this ATM switching system also have the effect of, after the reception side has attained a prescribed state, eliminating the reliance for a large part of their operations on cell fluctuations until N units of cells have been received. As a result, the capacity of the first-in, first-out type memory 5 does not need to be enlarged beyond the required capacity, and the amount of hardware needed and the financial costs incurred may also be reduced.

Preferred Embodiment

Below, the preferred embodiment of the present invention will be explained by referring to the diagrams.

Figure 9:
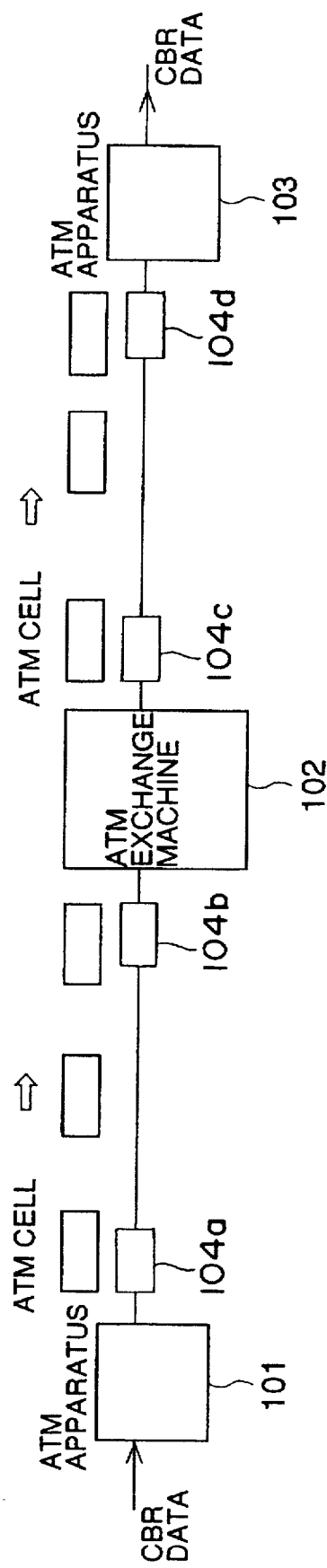
FIG. 9 is a configuration diagram of the ATM system of the preferred embodiment.

The ATM system that uses the ATM cell fluctuation absorption apparatus of the preferred embodiment The ATM cell fluctuation absorption apparatus of the present preferred embodiment is provided in the form of being incorporated within an ATM apparatus; this ATM apparatus is, for example, used within an ATM system such as that shown in FIG. 9.

Furthermore, the transmission speed of the ATM system is, for example, 155.52 Mbps (19.44 Mbyte/s), and ATM cells transmitted at this transmission speed store CBR data such as sound, image, etc. Below, an example is explained using 64 Kbps (8 Kbyte/s) of sound data.

Below is an explanation of the configuration elements of the ATM system of FIG. 9.

(a) First ATM apparatus 101

The first ATM apparatus 101, at a fixed information speed, stores CBR data that is desirable for reproduction within the ATM cells and outputs these cells. For the purpose of explanation, within FIG. 9, the ATM apparatus 101 is made to be the sending side. Furthermore, CBR(Constant Bit Rate) data is, specifically, sound, image, etc., information.

(b) ATM exchange machine 102

The ATM exchange machine 102 is connected to the first ATM apparatus 101; after storing the ATM cells inputted from the first ATM apparatus within a buffer that is not shown in the diagram, it reads out these cells, and routes them to their destination point.

(c) Second ATM apparatus 103

The second ATM apparatus 103 is connected to the ATM exchange machine 102; it outputs CBR data stored within the ATM cells inputted from the ATM exchange machine 102. This second ATM apparatus 103 has incorporated within it the ATM cell fluctuation absorption apparatus.

Furthermore, within some systems, the second ATM apparatus 103 is incorporated within the ATM exchange machine 102. In these types of cases, the ATM cell fluctuation absorption apparatus is incorporated within the ATM exchange machine 102.

(d) Line interface 104a–104d

The line interface 104a couples a transmission line to the first ATM apparatus 101. The line interface 104b and the line interface 104c couples a transmission line to the ATM exchange machine 102. The line interface 104d couples a transmission line to the second ATM apparatus 103.

The ATM cell fluctuation absorption apparatus may be incorporated within the line interface 104d instead of incorporated within the second ATM apparatus 103 or the ATM exchange machine 102.

The ATM Cell Fluctuation Absorption Apparatus

First will be explained the main symbols (abbreviations) and their names used within the diagrams referred to in the explanation below.

Symbols (Abbreviations) and Their Names

The symbols (abbreviations) and their names are shown below in the form of symbol:name.

ATMDT:ATM data; CECK:cell clock; CKI:clock input; DT:data; EMPTY:empty; FULL:full; NC:network clock; PG:payload gate; POR:power-on reset; RC:read clock; RDST:read start; RDSTP:read stop; RI:received information; RST:reset; SN:sequence number; SNINFO:serial number sequence information; SNRD:sequence number read; UC:user clock; UI:user information; UICK:user information clock; WC:write clock.

Furthermore, when an X is attached to the beginning of a symbol (abbreviation), it means operating is performed with negative logic. Also, when an F is attached to the end of a symbol (abbreviation), and when an "A" or a number is attached to the end of a symbol (abbreviation), this means that an additional character has been attached to discriminate that name from the name of another, similar symbol (abbreviation).

Explanation of the Configuration Elements

Figure 10:
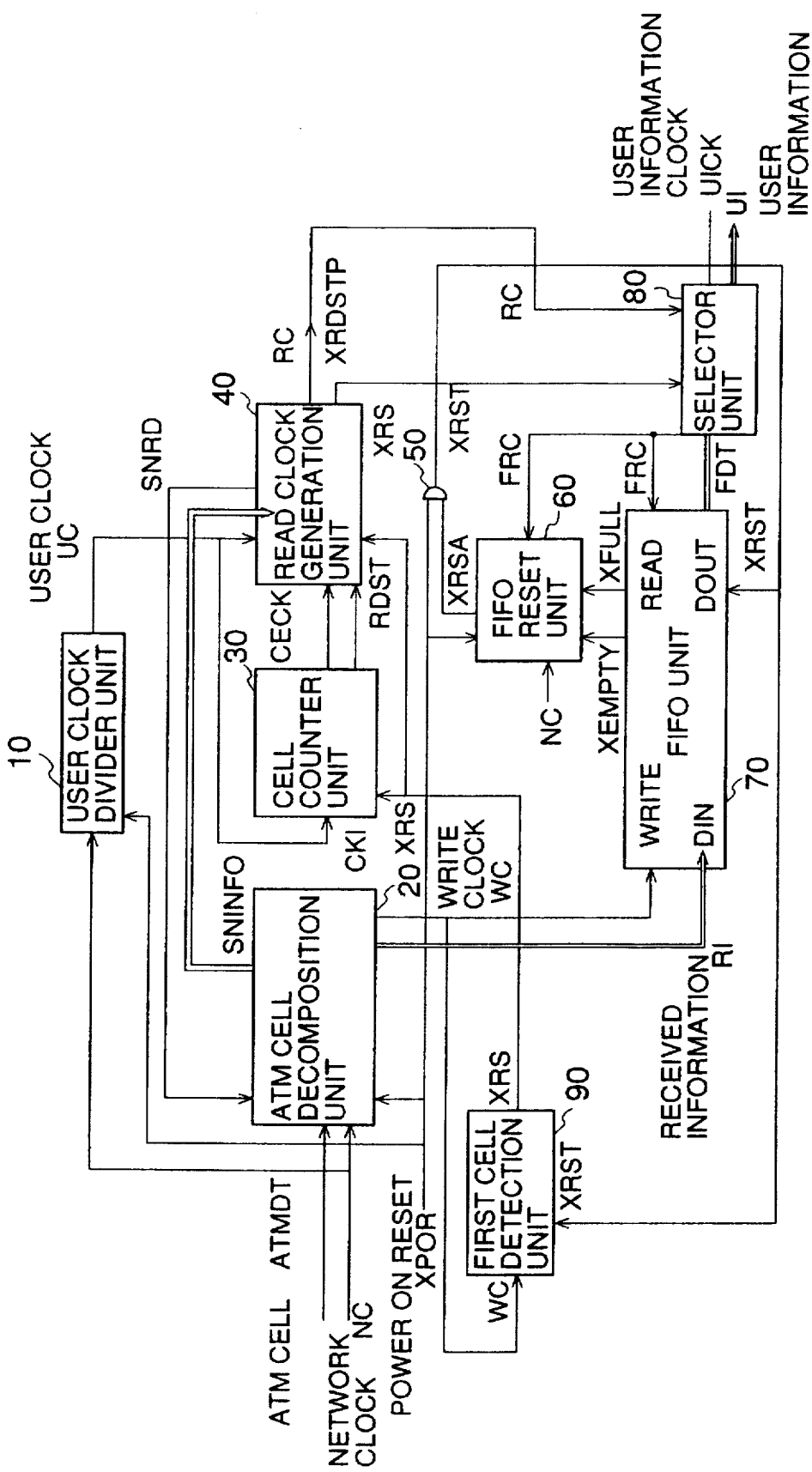
FIG. 10 is a configuration diagram of the ATM cell fluctuation absorption apparatus of the preferred embodiment.

FIG. 10 is a configuration diagram of the ATM cell fluctuation absorption apparatus of the present preferred embodiment.

The ATM cell fluctuation absorption apparatus, as shown in the diagram, is comprised of being equipped with a user clock divider unit 10, a ATM cell decomposition unit 20, a cell counter unit 30, a read clock generation unit 40, a FIFO reset generation unit 60, a FIFO unit 70, a selector unit 80, a first cell detection unit 90, and an AND circuit unit 50.

Below is an explanation of each configuration element.

User Clock Divider Unit 10

The user clock divider unit 10 uses the network clock NC, and is a circuit for generating the user clock UC that is the pulse signal used within the ATM cell fluctuation absorption apparatus; as shown in FIG. 11, it possesses a CLK input unit, a D output unit, and a XR input unit.

The CLK input unit inputs the network clock NC. The network clock NC is, for example, a 19.44 MHz pulse wave that is a 155.52 MHz divided 8 times.

The D output unit, in the case of the example of 64 Kbs sound data, outputs an 8 KHz user clock that is the network clock NC divided 2430 times.

The XR input unit inputs the power-on reset XPOR for resetting the user clock divider unit 10 itself.

FIG. 12 shows how the user clock UC is made by dividing the network clock NC by X (=19.44 MHz/8 KHz=2430).

ATM Cell Decomposition Unit 20

Figure 13:
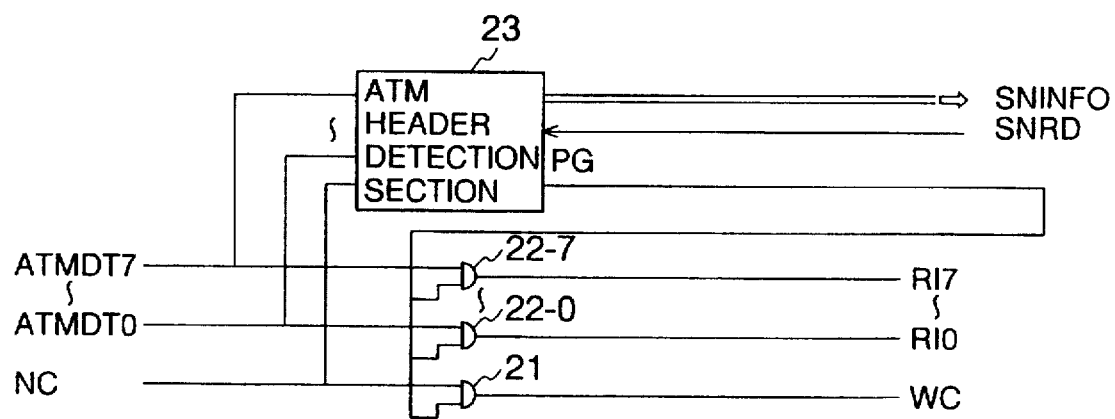
FIG. 13 is a configuration diagram of the ATM cell decomposition unit.

The ATM cell decomposition unit 20 is a circuit for extracting the 47 byte information unit (SAR-SDU) from received ATM cells and for writing that information into the FIFO unit 70; as shown in FIG. 13, it possesses an AND circuit 21, AND circuits 22-0 to 22-7, and an ATM header detection unit 23.

The AND circuit 21 performs conjunction operations on the network clock NC and the payload gate GP outputted from the ATM header detection unit 23, and outputs the operation value as a write clock WC. Furthermore, the payload gate PG is an "L" signal when it is processing the ATM header of the ATM cell and the SAR header, and an "H" signal when it is processing the SAR-SDU.

The AND circuits 22-0 to 22-7 perform, respectively, conjunction operations on the ATM data ATMDT 0–7 and the payload gate PG, and output the operation values as received information RI 0–7. Furthermore, the ATM data ATMDT 0–7 are values corresponding to bits 0–7 of each byte comprising the ATM cells.

Figure 14:
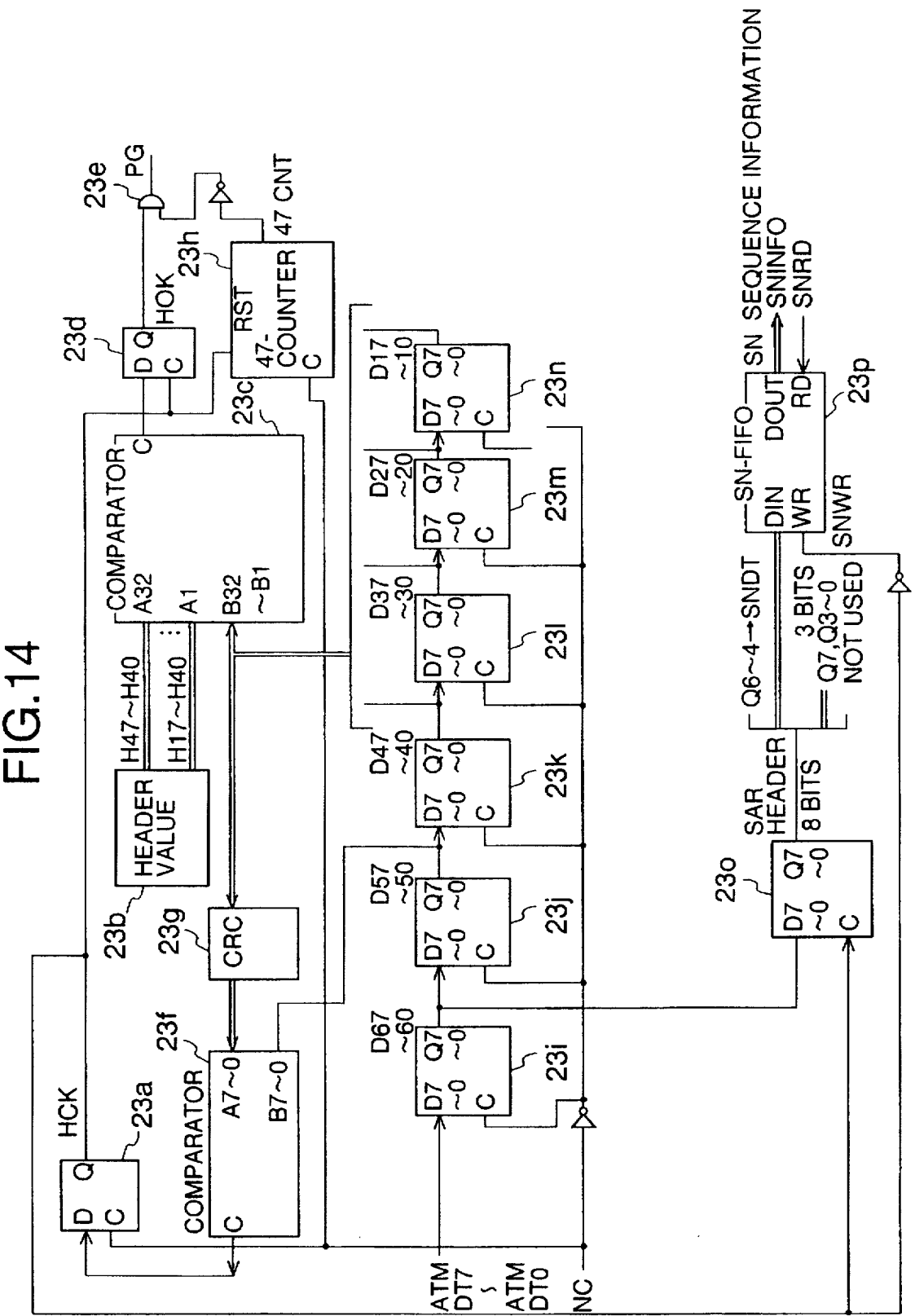
FIG. 14 is a configuration diagram of the ATM header detection unit.

The ATM header detection unit 23 is a circuit for detecting the ATM header (see FIG. 1) that occupies that 5-byte header portion of the ATM cell; as shown in FIG. 14, it is equipped with a D-FF 23a, a header value storage unit 23b, a comparator 23c, a D-FF 23d, an AND circuit 23e, a comparator 23f, a CRC computation unit 23g, a 47-counter 23h, a D-FF 23i, a D-FF 23j, a D-FF 23k, a D-FF 23l, a D-FF 23m, a D-FF 23n, a D-FF 23o, and a SN-FIFO 23p.

Below is an explanation of the configuration elements listed above.

(a) D-FF 23a

The D-FF 23a uses the network clock NC to latch the signal outputted by the C portion of comparator 23f, and Q outputs it as a header check HCK.

(b) Head value storage device 23b

The header value storage device 23b stores a header value of 4 bytes×8 bits; in other words, a 32-bit header value. In FIG. 14, the number following "H" indicates whichever byte 1–4; the next number shows the bit location within that byte.

(c) Comparator 23c

The comparator 23c possesses two 32-bit input units, A1-32 and B1-32; it compares the values of these: if they match, it outputs an "H" to the C output unit; if they do not match, it outputs an "L". Furthermore, the header values stored by the header value storage device 23b are inputted into the input unit A1-32, while D47-D10, which is the Q output outputted from the D-FF 23k–23n, is inputted into the input unit B1-32.

(d) D-FF 23d

The D-FF 23d uses the header check HCK outputted from the D-FF 23a to latch the signal outputted from the C output unit of comparator 23c, and Q outputs this as a header OK HOK which shows whether or not the header is OK.

(e) AND circuit 23e

The AND circuit 23e performs conjunction computation on the header OK HOK outputted from the D-FF 23d and the inversion value of the output of the 47-counter 23h, and outputs the computational value as the payload gate PG.

(f) Comparator 23f

The comparator 23f possesses two 8-bit input units, A7-0 and B7-0; it compares the values of these: if they match, it outputs an "H" to the C output unit; if they do not match, it outputs an "L". Furthermore, the output value from the CRC computation unit 23g is inputted into the input unit A7-0, while D57-50, which is the Q output of the D-FF 23j, is inputted into the input unit B7-0.

(g) CRC computation unit 23g

The CRC computation unit 23g inputs the Q output (a total of 32 bits) outputted from D-FF 23k-23n, performs a CRC computation of $X^3+X+1$, and outputs the computational value.

(h) 47-counter 23h

The 47-counter 23h inputs the network clock NC, counts the pulses within the NC, and every time it has counted 47 pulses, outputs a 47 CNT showing that it has counted 47 pulses. This 47-counter 23h is reset through the header check HCK outputted from the D-FF 23a.

(i) D-FF 23i

The D-FF 23-i latches the ATM data ATMDT 0-7 using the inverted value of the network clock, and Q outputs these as D67-D60.

(j) D-FF 23j

The D-FF 23j latches D67-D60 Q outputted from the DFF 23i using the inverted value of the network clock, and Q outputs these as D57-D50.

(k) D-FF 23k

The D-FF 23k latches D57-D50 Q outputted from the D-FF 23j using the inverted value of the network clock, and Q outputs these as D47-D40.

(l) D-FF 23l

The D-FF 23l latches D47-D40 Q outputted from the DFF 23k using the inverted value of the network clock, and Q outputs these as D37-D30.

(m) D-FF 23m

The D-FF 23m latches D37-D30 Q outputted from the DFF 23l using the inverted value of the network clock, and Q outputs these as D27-D20.

(n) D-FF 23n

The D-FF 23n latches D27-D20 Q outputted from the DFF 23m using the inverted value of the network clock, and Q outputs these as D17-D10.

(o) D-FF 23o

The D-FF 23o latches D67-D60 Q outputted from the D-FF 23i using the header check HCK outputted from the D-FF 23a, and Q outputs these as the SAR header.

(p) SN-FIFO 23p

The SN-FIFO 23p is the first-in, first-out type memory; it inputs from the DIN unit the 6–4 bits of the SAR header outputted from the D-FF 23o, and stores this with the rise of the sequence number write SNWR of the inversion of the header check HCK of the D-FF 23a to be inputted into the WR unit. Then, when the sequence number read SNRD signal is inputted into the RD unit, the stored data is outputted as serial number sequence information SNINFO from the DOUT unit.

Furthermore, the reason why only the 6–4 bits of the SAR header outputted from the D-FF 23o are inputted is because the sequence number of the ATM cell is indicated by 3 bits.

Figure 15:
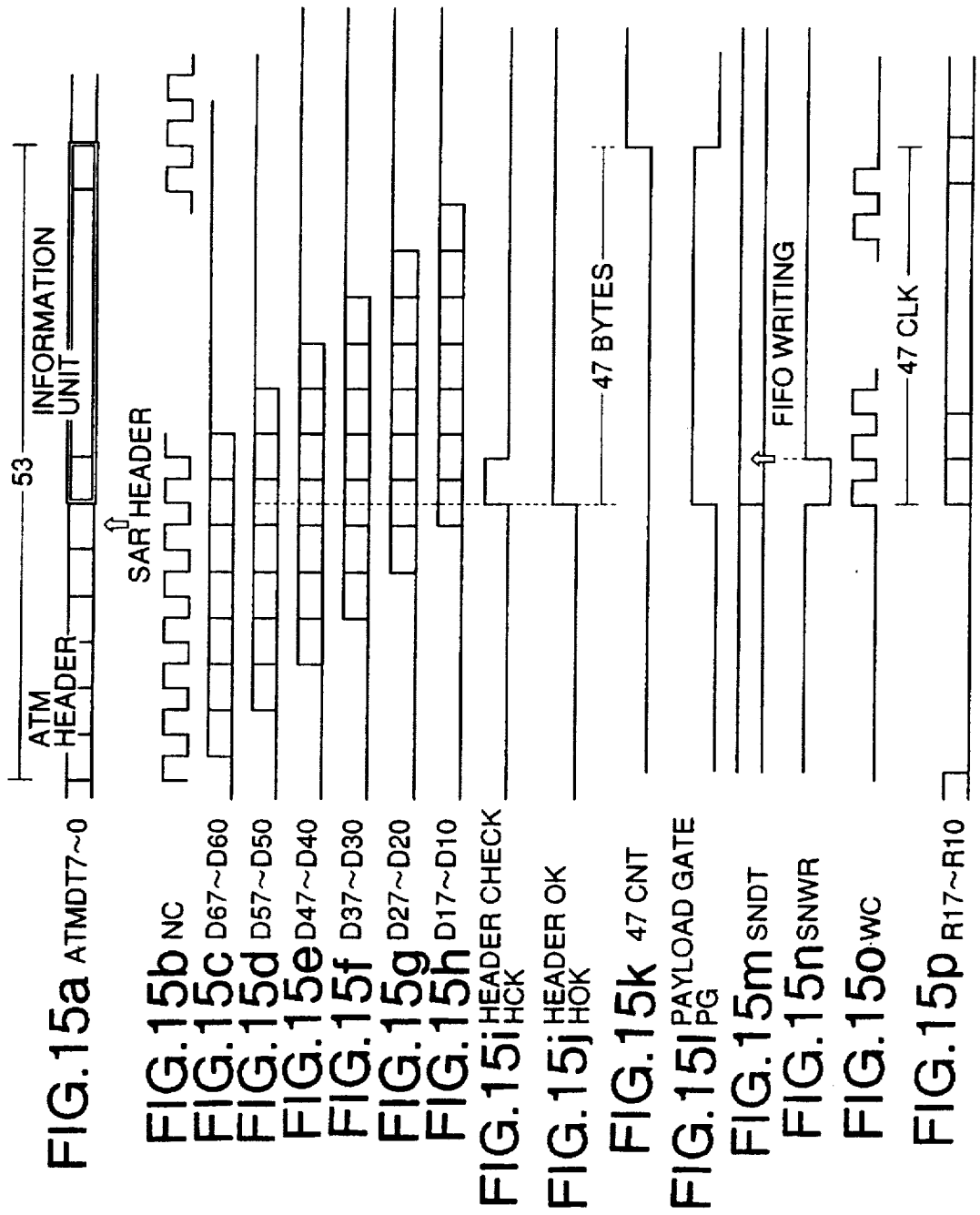
FIG. 15 is an operations diagram of the ATM cell decomposition unit and the ATM header detection unit.

Next is an explanation of the operation of the ATM cell decomposition unit 20 and the operation of the ATM header detection unit 23 while referring to FIG. 15.

First, the data from the first byte from the header of the inputted ATM cell is segmented synchronously to the fall of the network clock NC, and becomes the data of D67-60. Synchronously to the next fall of the NC, the data of D67-60 becomes the data of D57-50, and, along with this, the second byte of the ATM cell is segmented, and becomes the data of D67-60. Then, synchronously to the next fall of the NC, the data of D57-50 becomes the data of D47-40, and, along with this, the data of D67-60 becomes the data of D57-50, and the third byte of the ATM cell is segmented and becomes the data of D67-60. This type of operation is performed repeatedly, and when the first byte of the header of the ATM cell is stored within D17-10, the ATM header 4 bytes and the HEC are checked; if they are legitimate, the header check HCK signal is turned on. Additionally, the ATM header stored within D17-10, D27-20, D37-30, and D47-40, and the value of the header value storage unit 23b are compared, and, in the case where it is determined that this is an ATM cell that should be received, the header OK HOK and the payload gate PG are turned on.

When the header OK HOK is turned on, the 47 bytes of the information unit (SAR-SDU) of the ATM cell are counted, and at the time when the 47 bytes have been counted, the payload gate PG is turned off.

Also, during the time when the payload gate PG is on, the write clock WC is generated, and the received information RI 7-0 is stored within the FIFO unit 70.

Cell Counter Unit 30

Figure 16:
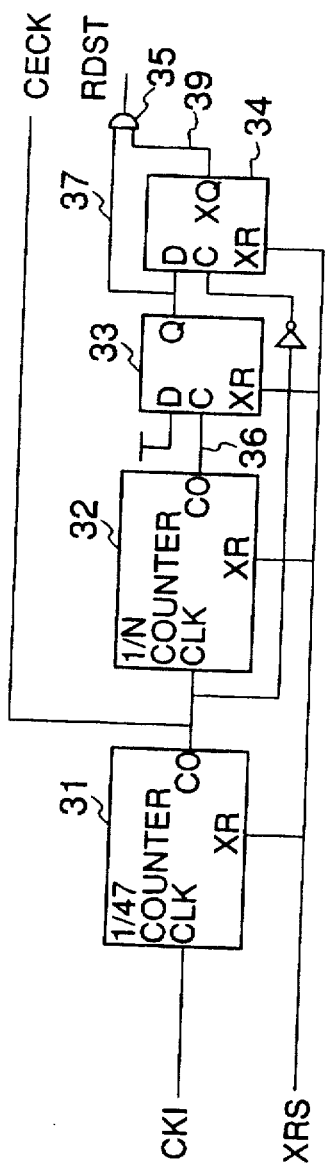
FIG. 16 is a configuration diagram of the cell counter unit.

The cell counter unit 30, after it has been reset with a reset signal XRS outputted from the first cell detection unit 90 that has detected the first ATM cell, is a circuit for counting a prescribed time with the cell interval (47-bit units) in the case where there is no ATM cell fluctuation; as shown in FIG. 16, it possesses the 1/47 counter 31, the 1/N counter 32, the D-FF 33, and the D-FF 34.

The 1/47 counter 31 possesses a CLK input unit for inputting the clock-in pulse CKI, and it counts the pulses within the CKI; every time it counts 47 pulses, it outputs from the CO unit a cell clock CECK that shows that 47 pulses have been counted. Because the clock-in pulse CKI is supplied from the user clock, the cell clock CE shows the cell interval in the case where there is no ATM cell fluctuation. Furthermore, the 1/47 counter 31 is reset with a reset signal XRS.

The 1/N counter 32 possesses a CLK input unit for inputting the cell clock CECK, and it counts the pulses within the CECK; every time it counts N pulses, it outputs from the CO unit a signal 36 that shows that N pulses have been counted. Furthermore, the 1/N counter 32 is reset with a reset signal XRS.

The D-FF 33 latches the signal held in "H" with the signal 36 outputted from the 1/N counter 32, and outputs this as signal 37. The D-FF 33 is reset with a reset signal XRS.

The D-FF 34 latches the Q output outputted from the D-FF 33 with the inverted value of the cell clock CECK, and outputs this as signal 39.

The AND circuit 35 performs conjunction computation on the signal 37 outputted from the D-FF 33 and the signal 39 outputted from the D-FF 34, and outputs this computational value as the read start RDST.

Figure 17D:
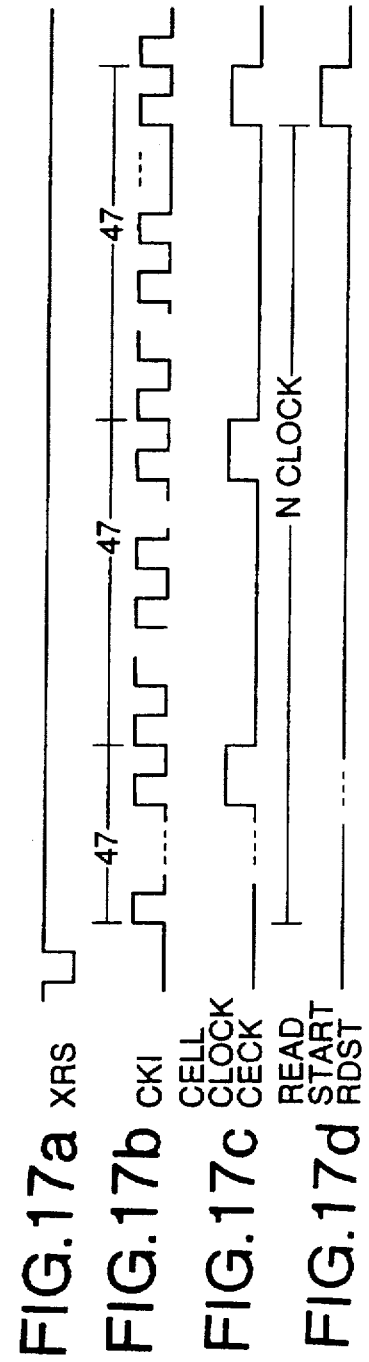
FIG. 17 is an operations diagram of the cell counter unit.

FIG. 17 shows the operation of the cell counter unit 30.

First, after the reset signal XRS has been changed from "L" to "H", when the clock-in pulse CKI has generated 47 pulses, the cell clock CECK generates 1 pulse. This operation is performed repeatedly, and when the cell clock CECK has generated N pulses, the read start RDST generates 1 pulse. Afterwards, as long as a descending pulse is not inputted into the reset signal XRS, no RDST will be generated.

Read Clock Generation Unit 40

Figure 18:
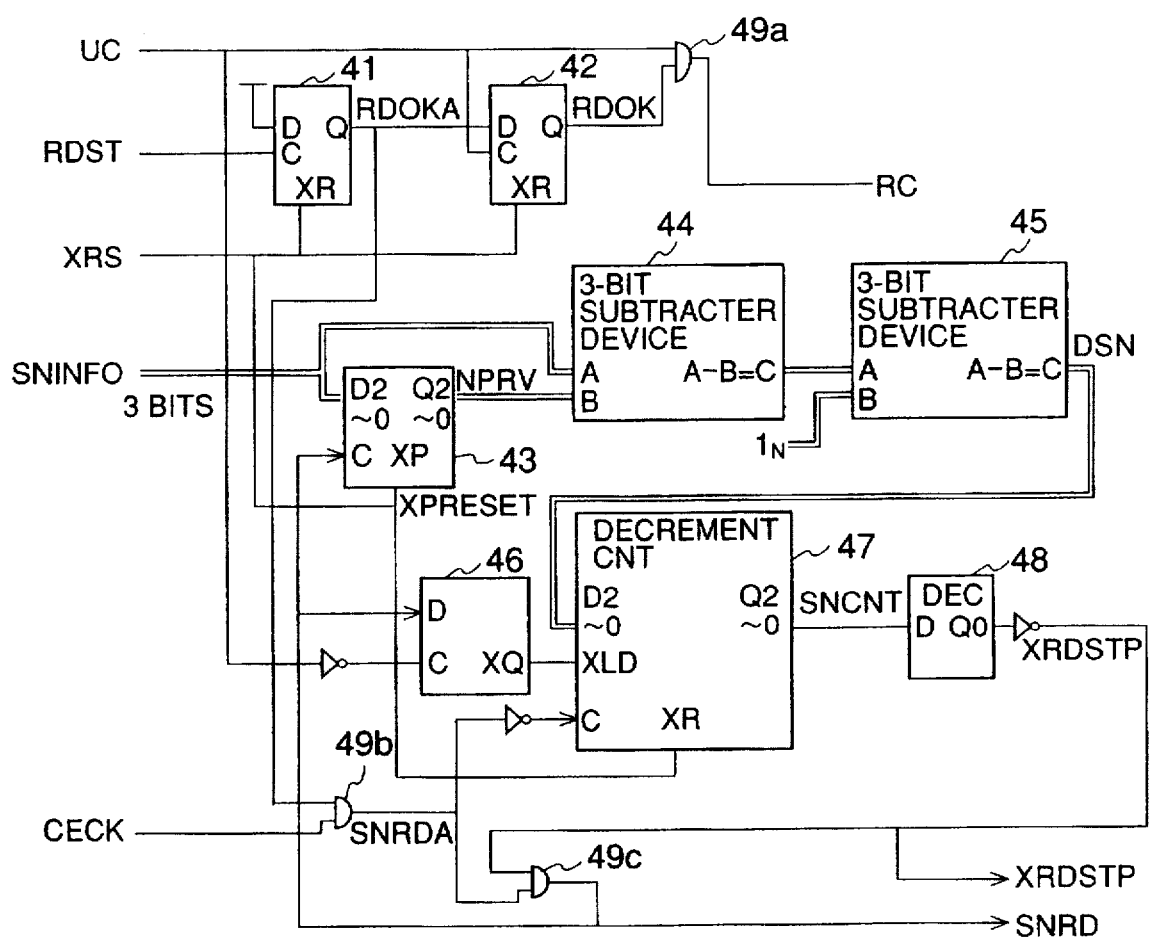
FIG. 18 is a configuration diagram of the read clock generation unit.

The read clock generation unit 40, as shown in FIG. 18, is comprised of being equipped with the D-FF 41, the D-FF 42, the D-FF 43, the 3-bit subtracter device 44, the 3-bit subtracter device 45, the D-FF 46, the counter 47, the decoder 48, the AND circuit 49a, the AND circuit 49b, and the AND circuit 49c.

(a) D-FF 41

The D-FF 41 latches the signal held in "H" with the read start RDST, and Q outputs this as a read OK RDOKA. Furthermore, the D-FF 41 is reset with a reset signal XRS.

(b) D-FF 42

The D-FF 42 latches the read OK RDOKA with the user clock UC, and outputs this as a read OK RDOK. Furthermore, the D-FF 42 is reset with a reset signal XRS.

(c) D-FF 43

The D-FF 43 latches the 3-bit serial number sequence information SNINFO with the serial number read SNRD outputted from the AND circuit 49c, and Q outputs this as NPRV. Furthermore, the serial number sequence information SNINFO is equivalent to the serial number of the most recently inputted ATM cell; the NPRV is equivalent to the serial number of the ATM cell inputted just prior to the most recent cell. The D-FF 43 is reset with a reset signal XRS.

(d) 3-bit subtracter device 44

The 3-bit subtracter device 44 subtracts the NPRV from the serial number sequence information SNINFO, and outputs the computational result.

(e) 3-bit subtracter device 45

The 3-bit subtracter device 45 subtracts 1 from the computational result outputted from the 3-bit subtracter device 44, and outputs the computation result as a serial number difference DSN.

(f) D-FF 46

The D-FF 46 latches the serial number read SNRD outputted from the AND circuit 49c with the inverted value of the user clock.

(g) Counter 47

The counter 47 inputs the serial number difference DSN outputted from the 3-bit subtracter device 45, subtracts 1 at a time with the value outputted from the AND circuit 49b, and outputs the computational result as the serial number count SNCNT. Furthermore, the counter 47 is reset with a reset signal XRS.

(h) Decoder 48

The decoder 48 decodes the SNCNT outputted from the counter 47, and when the SNCNT was a "000", outputs a "1". The read stop XRDSTP was used to invert this output.

(i) AND circuit 49a

The AND circuit 49a performs conjunction computation on the user clock UC and the read OK RDOK to be outputted from the D-FF 42; it outputs this computational result as the read clock RC.

(j) AND circuit 49b

The AND circuit 49b performs conjunction computation on the RDOKA to be outputted from the D-FF 41 and the cell clock CECK; it outputs this computational result as the serial number read SNRDA.

(k) AND circuit 49c

The AND circuit 49c performs conjunction computation on the read stop XRDSTP and the serial number read SNRDA; it outputs this computational result as the serial number read SNRD.

FIG. 19 shows the operation of the read clock generation unit 40.

First, the reset signal is changed from "L" to "H"; after this, when the read start pulse RDST enters, after the pulse is held at the D-FF 41, the pulses are brought in phase at D-FF 42, and the read OK RDOK is changed from negative to positive. Through conjunction computation of this read OK RDOK and the user clock UC, the read clock RC is generated.

FIG. 20 shows the operations of the ATM header detection unit 23 and the read clock generation unit 40 at the time of cell loss. Also, FIG. 21 shows the operations of the read clock generation unit 40 and the ATM header detection unit 23. Since there are many portions of FIG. 20 and FIG. 21 which show common operations, these diagrams will be explained together below.

Here, of the serial numbers SN 0 through 7 of the ATM cells, the ATM cells with SN 1, 2, and 3 are assumed to have been lost. Also, N=2; in other words, after the serial number data, designated SNDT, has become "0", and following the lapse of two units of read-out timing, data read-out is assumed to be performed.

First, after the SNDT has become "0" and two units of read-out timing have elapsed, an RDST pulse is generated for instructing data read-out from the FIFO unit 70 (see FIG. 21), and, at the same time, an SNRD pulse is generated. At this time, since the SN=0 ATM cell is read, SNINFO becomes "0". Next, when an SNRD pulse has been generated, since SN=4 ATM cell is read, the SNINFO becomes "4". This SNINFO, after having next read in the SN=5, SN=6, etc., data, falls behind in read-out timing by 2 units, and thus takes the values "5", "6", etc.

The values of SNINFO are reflected in the SNCNTs, and when the SNCNT has changed from "0" to "3", an XRSTP pulse is generated ("H" becomes "L") for instructing a stoppage of data read-out from the FIFO unit 70.

Then, each time the read-out timing lapses 1 unit, the SNINFO value is decreased by 1, and when it becomes "0", the XRSTP pulse changes from "L" to "H", and read-out from the FIFO unit 70 is made to continue.

First Cell Detection Unit 90

The first cell detection unit 90 is a circuit for generating XRS; as shown in FIG. 22, it possesses the D-FF 91, the D-FF 92 and the AND circuit 93.

The D-FF 91 is a circuit for holding the write clock WC directly after the ATM fluctuation absorption apparatus is reset; it latches the signal held in "H" with the write clock WC, and Q outputs the signal a1. The D-FF 91 is reset with a reset signal XRST.

The D-FF 92 is a circuit for differentiating signal a1 and making it a pulse-state signal; it latches the signal a1 with the write clock WC, and outputs the inverse signal a2. The D-FF 92 is reset with a reset signal XRST.

The AND circuit 93 performs conjunction computation of signal a1 and signal a2, and outputs the inversion value of this computational result as the XRS.

FIG. 23 shows the operation of the first cell detection unit 90.

First, the D-FF 91 and the D-FF 92 are reset with a reset signal XRST.

Next, synchronously with the rise of the write clock WC from "L" to "H", the signal a1 changes from "L" to "H". After this, until the reset signal XRST enters, regardless of the value of the write clock WC, it holds "H".

Then, synchronously with the rise of the signal a1 from "L" to "H", the XRS changes from "H" to "L", and synchronously with the rise of the write clock from "L" to "H", the XRS changes from "L" to "H".

The FIFO Reset Generation Unit 60

The FIFO reset generation unit 60, in the case where the FIFO unit 70 was read in an empty state and in the case where the FIFO unit 70 has become full, is a circuit for generating a signal XRSA for resetting the FIFO unit 70; as shown in FIG. 24, it possesses the D-FF 61, the AND circuit 62, the D-FF 63, the D-FF 64, and the AND circuit 65.

The D-FF 61 latches the inverted value of XEMPTY with the FIFO read clock FRC, and outputs the inverted Q output signal d1. This becomes the inverted Q output because an "X" is attached before the "Q". The D-FF 61 is reset with the power-on reset XPOR. Here, "XEMPTY" is a signal generated from the FIFO unit 70 in the case when the FIFO unit 70 has been read in an empty state.

The AND circuit 62 performs conjunction computation on the signal d1 and the XFULL, and outputs the inversion value of this computational result. Here, "XFULL" is the signal generated from the FIFO unit 70 in the case where the FIFO unit 70 has become full.

The D-FF 63 latches the value outputted from the AND circuit 62 with the network clock NC, and outputs the Q output signal d2. The D-FF 63 is reset with the power-on reset XPOR.

The D-FF 64 latches the signal d2 with the network clock NC, and outputs the inverted Q output signal d3. The D-FF 64 is reset with the power-on reset XPOR.

The AND circuit 65 performs conjunction computation on the signals d2 and d3, and outputs the inversion value of this computational result as the XRSA.

FIG. 25 shows the operation of the FIFO reset generation unit 60.

As shown in the diagram, the inversion value of XEMPTY is latched with the FRC, and the signal d1 has become the inverted Q output.

Next, with the signal d1 or the XFULL at "L", and synchronously with the rise of the network clock NC from "L" to "H", the signal d2 changes from "L" to "H". Also, with the signal d1 and XFULL both at "H", and synchronously with the rise of the network clock NC from "L" to "H", the signal d2 is changed from "H" to "L", as can be seen in the diagram.

Then, the inversion value of the conjunction computation of signals d2 and d3 is output as the XRSA.

FIFO Unit 70

The FIFO unit 70 is a circuit for storing a prescribed length of the received information RI inputted from the ATM cell decomposition unit 20; it is equipped with a DIN unit, a DOUT unit, a WRITE input unit, and a READ input unit.

The DIN unit inputs the data to be stored.

The DOUT unit outputs stored data.

The WRITE unit inputs an instruction for storing data.

The READ unit inputs an instruction for outputting stored data.

FIG. 26 shows the operation of the FIFO unit 70.

First, after the reset signal XRS is changed from "L" to "H", the received information RI is inputted into the DIN unit synchronously with the write clock WC. Data inputted into this DIN unit becomes stored data FDT.

Then, when the FIFO read clock FRC changes from "L" to "H", the stored data FDT is outputted from the DOUT unit.

Selector Unit 80

The selector unit 80 outputs the FRC to the READ portion of the FIFO unit 70; meanwhile, when read-out from the FIFO unit 70 is initiated, it is also the circuit for initiating reproduction of the user information UI at a fixed speed; as shown in FIG. 27, it possesses a idle data storage unit 81, a selector 82, and an AND circuit 83.

The idle data storage unit 81 stores the alternate data ADT that becomes the substitute for lost ATM cells; here, the alternate data ADT is made to be all "0"s. Furthermore, the alternate data ADT may also take other values.

The selector 82 performs switching of the stored data FDT read out from the FIFO unit 70 and the alternate data ADT read out from the idle data storage unit 81.

AND Circuit 50

The AND circuit 50 performs conjunction computation on the XRSA outputted from the FIFO reset generation unit 60 and the power-on reset XPOR, and outputs this computational result as XRST. This XRST is supplied to the FIFO unit 70 and to the first cell detection unit 90.

The Effects of the Present Preferred Embodiment

Next follows an explanation of the effects of the present preferred embodiment while referring to FIGS. 29 through 31.

(A) The effect in the case where, after the reception side becomes a prescribed state, the interval between received cells until N number of cells has been received (the first N number cell) has been shortened due to a fluctuation The effect in the case where the first N number cell interval has been shortened due to a fluctuation will be explained by referring to FIG. 29. Furthermore, the "prescribed state" is said to be the state where the FIFO unit 70 has become either empty or full, and has been reset.

Within FIG. 29, the below-described (a) through (d) are shown in order.

(a) The state whereby cells are sent at a fixed interval T. Furthermore, within FIG. 29, "☐" indicates a cell.

(b) The state whereby, because of fluctuation, cells are received at non-fixed intervals $T_1, T_2 \ldots T_5$.

(c) The state whereby received cells are read out from the FIFO unit 70 at fixed timing T.

(d) The state wherein a cell amount has been stored within the FIFO unit 70. Furthermore, the FIFO unit 70 has a storage capacity of 4 units of cells.

With the previously discussed existing fluctuation absorption technology, when in the state of (a)–(c), as stated previously, at the point where the third cell has been read out, the FIFO unit 70 becomes empty, and an empty reset has occurred. This is because when the amount of cells stored within the FIFO unit 70 became 2 cells, it began to read out cells.

However, within the present preferred embodiment, N=2; in other words, after a 2-unit read-out timing has elapsed following the resetting of the FIFO unit 70, reading out of data from the FIFO unit 70 has been made to occur; therefore, as shown in (d), the FIFO unit 70 does not become empty. As a result, an empty reset does not occur, and stable operation is enabled.

(B) The effect in the case where, after the reception side becomes a prescribed state, the interval between received cells until N number of cells has been received (the first N number cell) has been lengthened due to a fluctuation The effect in the case where the first N number cell interval has been lengthened due to a fluctuation will be explained by referring to FIG. 30.

Within FIG. 30, the below-described (a) through (d) are shown in order.

(a) The state whereby cells are sent at a fixed interval T. Furthermore, within FIG. 30, "☐" indicates a cell.

(b) The state whereby, because of fluctuation, cells are received at non-fixed intervals $T_1, T_2 \ldots T_5$.

(c) The state whereby received cells are read out from the FIFO unit 70 at fixed timing T.

(d) The state wherein a cell amount has been stored within the FIFO unit 70. Furthermore, the FIFO unit 70 has a storage capacity of 4 units of cells.

With the previously discussed existing fluctuation absorption technology, when in the state of (a)–(c), as stated previously, prior to the reading out of the second cell, the FIFO unit 70 has become full, and a full reset has occurred. This is because when the amount of cells stored within the FIFO unit 70 became 2 cells, it began to read out cells.

However, within the present preferred embodiment, N=2; in other words, after a 2-unit read-out timing has elapsed following the resetting of the FIFO unit 70, reading out of data from the FIFO unit 70 has been made to occur; therefore, as shown in (d), the FIFO unit 70 does not become full. As a result, a full reset does not occur, and stable operation is enabled.

(C) The effect in the case where a portion of the ATM cell sequence has been lost Within FIG. 31, the below-described (a) through (d) are shown in order.

(a) The state wherein cells are being sent. Here, a number (SN) has been attached that cycles between 0–7. Moreover, within FIG. 31, "D" indicates a cell.

(b) The state whereby, because of fluctuation, cells are received at non-fixed intervals $T_1, T_2, \ldots, T_5$.

Here, the cells equivalent to SN=1–3 have been lost, and are considered as not having been received.

(c) The state whereby received cells are read out from the FIFO unit 70 at fixed timing T. Since the cells equivalent to SN=1–3 have been lost and are not stored within the FIFO unit 70, substitute dummy data is read out.

(d) The state wherein a cell amount has been stored within the FIFO unit 70. Furthermore, the FIFO unit 70 has a storage capacity of 4 units of cells.

With the previously discussed existing fluctuation absorption technology, when in the state of (a)–(c), as stated previously, after the cell amount stored within the FIFO unit 70 has reached 2 units, when read out of the cells is begun, at the point where the SN=4 cell is to be read out, the FIFO unit 70 becomes full, and a full reset has occurred. This is because when the amount of cells stored within the FIFO unit 70 became 2 cells, it began to read out cells.

However, within the present preferred embodiment, N=2; in other words, after a 2-unit read-out timing has elapsed following the resetting of the FIFO unit 70, reading out of data from the FIFO unit 70 has been made to occur; therefore, as shown in (d), the FIFO unit 70 does not become full. As a result, a full reset does not occur, and stable operation is enabled.

What is claimed is:

1. An apparatus for absorbing an arrival time delay fluctuation of a fixed length packet which stores information that is required to be transmitted at a fixed speed, said apparatus have a first-in, first-out type memory, and comprising:

a fixed length packet writing unit for reading out information stored within said fixed length packet and for writing into said first-in, first-out type memory, a first cell detection unit for detecting a fixed length packet which is first received, subsequent to each of the cases that power is applied to the apparatus, that data read-out is performed in a state of said first-in, first-out type memory being empty, and that data writing is performed in a state of said first-in, first-out type memory in which data is stored up to upper limit, a read-out timing generation unit for generating read-out timing that shows read-out initiation following a prescribed time lapse, in the case where said first cell detection unit detects the said fixed length packet received first, and a read-out unit for starting reading out of information stored in said first-in, first-out type memory, and for continuing the reading out of data in synchronized with a user clock, in the case where read-out timing is generated with said read-out timing generation unit.

2. The apparatus according to claim 1, wherein said read-out timing generation unit inputs a fixed-cycle clock from an external source in order to measure the lapse of the prescribed time.

3. The apparatus according to claim 1, wherein in the case where said first cell detection unit detects said fixed length packet received first, said read-out timing generation unit is reset.

4. The apparatus according to claim 1, wherein said read-out timing generation unit uses the user clock to measure the prescribed time lapse, thereby generating said read-out timing.

5. The apparatus according to claim 1, wherein the user clock to be inputted into said read-out timing generation unit is generated based on a network clock.

6. A method for absorbing an arrival time delay fluctuation of a fixed length packet which stores information that is required to be transmitted at a fixed speed, for systems having a first-in, first-out type memory, said method comprising the steps of:

a fixed length packet writing step for reading out information stored within said fixed length packet and for writing into said first-in, first-out type memory, a first cell detection step for detecting a fixed length packet which is first received, subsequent to one each of the cases that power is applied to the apparatus, that data read-out is performed in a state of said first-in, first-out type memory being empty, and that data writing is performed in a state of said first-in, first-out type memory in which data is stored up to upper limit, a read-out timing generation step for generating read-out timing that shows read-out initiation following a prescribed time lapse, in the case where said first cell detection step detects the said fixed length packet received first, and a read-out step for starting reading out of information stored in said first-in, first-out type memory, and for continuing the reading out of data in synchronized with a user clock, in the case where read-out timing is generated with said read-out timing generation step.

7. An ATM switching system, having an ATM cell switch, comprising:

a line interface coupling a transmission line to said ATM cell switch, said line interface comprising:

a fixed length packet writing unit for reading out information stored within an ATM cell and for writing into a first-in, first-out type memory, a fixed cell detection unit for detecting an ATM cell which is first received, subsequent to each of the cases that power is applied to the apparatus, that data read-out is performed in a state of said first-in, first-out type memory being empty, and that data writing is performed in a state of said first-in, first-out type memory in which data is stored up to upper limit;

a read-out timing generation unit for generating read-out timing that shows read-out initiation following a prescribed time lapse, in the case where said first cell detection unit detects said ATM cell received first, and a read-out unit for starting reading out of information stored in said first-in, first-out type memory, and for continuing the reading out of data in synchronized with a user clock, in the case where read-out timing is generated with said read-out timing generation unit.

8. The ATM switching system according to claim 7, wherein said read-out timing generation unit inputs a fixed-cycle clock from an external source in order to measure the lapse of the prescribed time.

9. The ATM switching system according to claim 7, wherein in the case where said first cell detection unit detects said ATM cell received first, said read-out timing generation unit is reset.

10. The ATM switching system according to claim 7, wherein said read-out timing generation unit uses the user clock to measure the prescribed time lapse, thereby generating said read-out timing.

11. The ATM switching system according to claim 7, wherein the user clock to be inputted into said read-out timing generation unit is generated based on a network clock.

* * * * *